US011354455B2

(12) United States Patent
Hathorn et al.

(10) Patent No.: US 11,354,455 B2
(45) Date of Patent: Jun. 7, 2022

(54) MAINTENANCE OF ACCESS FOR SECURITY ENABLEMENT ON A HOST SYSTEM

(71) Applicant: INTERNATIONAL BUSINESS MACHINES CORPORATION, Armonk, NY (US)

(72) Inventors: Roger G. Hathorn, Tucson, AZ (US); Patricia G. Driever, Poughkeepsie, NY (US); Christopher J. Colonna, Ossining, NY (US); Evan Rivera, Carmel, NY (US); John R. Flanagan, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 16/568,117

(22) Filed: Sep. 11, 2019

(65) Prior Publication Data

US 2021/0073422 A1 Mar. 11, 2021

(51) Int. Cl.
*G06F 21/85* (2013.01)
*G06F 21/44* (2013.01)
*G06F 13/20* (2006.01)

(52) U.S. Cl.
CPC .............. *G06F 21/85* (2013.01); *G06F 21/44* (2013.01); *G06F 13/20* (2013.01); *G06F 2213/40* (2013.01); *G06F 2221/2101* (2013.01)

(58) Field of Classification Search
CPC .......... G06F 21/82; G06F 21/85; G06F 21/44; G06F 13/20
See application file for complete search history.

(56) References Cited

U.S. PATENT DOCUMENTS

| | | | | |
|---|---|---|---|---|
| 6,219,771 | B1 | 4/2001 | Kikuchi et al. | |
| 6,832,313 | B1 | 12/2004 | Parker | |
| 7,191,437 | B1 * | 3/2007 | Coatney | G06F 8/65 714/24 |
| 8,250,625 | B2 | 8/2012 | Risley | |
| 8,275,950 | B2 | 9/2012 | Sanada et al. | |

(Continued)

FOREIGN PATENT DOCUMENTS

| | | |
|---|---|---|
| CN | 102063583 A | 5/2011 |
| CN | 101449275 | 11/2011 |

(Continued)

OTHER PUBLICATIONS

Transmittal of Information on Confidential Activities dated Feb. 21, 2020, pp. 1.

(Continued)

*Primary Examiner* — Daniel B Potratz
(74) *Attorney, Agent, or Firm* — Konrad Raynes Davda & Victor LLP; Rabindranath Dutta

(57) ABSTRACT

A host port is enabled for security. In response to a determination by the host port that authentication or security association negotiation with a storage port cannot be completed successfully, the host port determines whether an audit mode indicator has been enabled in a login response from the storage port. The host port preserves input/output (I/O) access to the storage port based on determining whether the audit mode indicator has been enabled in the login response from the storage port.

14 Claims, 17 Drawing Sheets

(56) References Cited

U.S. PATENT DOCUMENTS

| | | | |
|---|---|---|---|
| 8,479,266 | B1 | 7/2013 | Delker et al. |
| 8,504,823 | B2 | 8/2013 | Carpenter et al. |
| 8,649,768 | B1 | 2/2014 | Gaddam et al. |
| 8,799,436 | B2 | 8/2014 | Ayachitula et al. |
| 8,844,025 | B2 | 9/2014 | Russo et al. |
| 9,043,883 | B2 | 5/2015 | Touve et al. |
| 9,058,191 | B2 | 6/2015 | Gupta et al. |
| 9,143,937 | B2 | 9/2015 | Cherian et al. |
| 9,210,178 | B1 | 12/2015 | Roth et al. |
| 9,246,898 | B2 | 1/2016 | McKeeman et al. |
| 10,033,702 | B2 | 7/2018 | Ford et al. |
| 10,210,127 | B2 | 2/2019 | Ainscow et al. |
| 10,324,507 | B2 | 6/2019 | Mullins et al. |
| 10,389,550 | B1 * | 8/2019 | Bharadwaj ........ H04L 12/40143 |
| 11,188,658 | B2 | 11/2021 | Hathorn et al. |
| 11,188,659 | B2 | 11/2021 | Hathometai. |
| 2004/0107342 | A1 | 6/2004 | Pham et al. |
| 2006/0009195 | A1 | 1/2006 | Itoh |
| 2006/0161445 | A1 | 7/2006 | Frank |
| 2008/0005565 | A1 | 1/2008 | Shiga et al. |
| 2008/0022120 | A1 | 1/2008 | Factor et al. |
| 2010/0154053 | A1 | 6/2010 | Dodgson et al. |
| 2011/0016368 | A1 | 1/2011 | Ayachitula et al. |
| 2013/0024639 | A1 | 1/2013 | Yamamoto et al. |
| 2014/0229737 | A1 | 8/2014 | Roth et al. |
| 2016/0139845 | A1 | 5/2016 | Muhlestein et al. |
| 2016/0342798 | A1 | 11/2016 | Smith et al. |
| 2016/0378691 | A1 | 12/2016 | Sherman |
| 2018/0077570 | A1 | 3/2018 | Hassan |
| 2018/0198616 | A1 | 7/2018 | Feather et al. |
| 2018/0330101 | A1 | 11/2018 | Dietsch et al. |
| 2018/0367309 | A1 | 12/2018 | Reinhold |
| 2018/0367516 | A1 | 12/2018 | Mundra et al. |
| 2019/0116052 | A1 | 4/2019 | Kim et al. |
| 2019/0213104 | A1 | 7/2019 | Qadri et al. |
| 2019/0251282 | A1 | 8/2019 | Patel et al. |
| 2019/0394021 | A1 | 12/2019 | Awad et al. |
| 2021/0042447 | A1 | 2/2021 | Doll et al. |
| 2021/0073394 | A1 | 3/2021 | Hathorn et al. |

FOREIGN PATENT DOCUMENTS

| | | | |
|---|---|---|---|
| CN | 103425916 | A | 12/2013 |
| CN | 104022867 | | 9/2014 |
| CN | 108173769 | | 6/2018 |
| CN | 108197504 | | 6/2018 |
| CN | 208384574 | | 1/2019 |
| CN | 109510842 | | 3/2019 |
| CN | 109690541 | | 4/2019 |
| CN | 109995792 | | 7/2019 |
| CN | 209057241 | | 7/2019 |
| CN | 110222531 | | 9/2019 |
| EP | 1276034 | A2 | 1/2003 |
| JP | 2014232462 | A | 12/2014 |
| KR | 101552950 | B1 | 9/2015 |
| WO | 2018226265 | A1 | 12/2018 |

OTHER PUBLICATIONS

International Search Report and Written Opinion for International Application No. PCT/IB2020/058158, dated Dec. 16, 2020, 9 pp. [18.892PCT (ISR & WO)].

International Search Report and Written Opinion for International Application No. PCT/IB2020/058160, dated Dec. 16, 2020, 9 pp. [18.894PCT (ISR & WO)].

International Search Report and Written Opinion for International Application No. PCT/IB2020/058161, dated Dec. 16, 2020, 10 pp. [18.895PCT (ISR & WO)].

International Search Report and Written Opinion for International Application No. PCT/IB2020/058163, dated Dec. 16, 2020, 10 pp. [18.896PCT (ISR & WO)].

"Amazon Web Services: Overview of Security Processes", Amazon, 2018, pp. 95.

"Introduction to AWS Security Processes", Amazon, Jun. 2016, pp. 45.

M.K. Sah, et al., "Security and Concurrency Control in Distributed Database System", International Journal of scientific research and management, vol. 2, Issue 12, pp. 1839-1845, 2017.

Anonymous, "Cognitive Storage Subsystem Secure Volumes", ip.com, IP.com No. IPCOM000253178D, Mar. 12, 2018, pp. 4.

Anonymous, "Methodology and Procedure for Secure Granular Authorization and Audit Implementation in Distributed Enterprise Computing Environment", ip.com, IP.com No. IPCOM000237293D, Jun. 11, 2014, pp. 18.

Anonymous, "A Method and System for Providing High Transaction Rate Authentication using Multiple Secondary Real Time Authentication Parameters", IP.com, IP.com No. IPCOM000229944D, Aug. 8, 2013, pp. 2.

Anonymous, "System for Optimizing Authentication in a Multi-Threaded Environment", IP.com, IP.com No. IPCOM000223083D, Nov. 1, 2012, pp. 4.

"Storage device and system with authentication mechanism", IP.com, IP.com No. IPCOM000225630D, Feb. 22, 2013, pp. 4.

Anonymous, "Method for Flexible and Diverse Error Handling for Storage Devices", IP.com, IP.com No. IPCOM000233966D, Jan. 6, 2014, pp. 7.

Anonymous, "Method and Apparatus for Authentication in Storage Systems using QR code", IP.com, IP.com No. IPCOM000255722D, Oct. 11, 2018, pp. 6.

Anonymous, "Port Based Network Security for communication networks in a gaming environment", IP.com, IP.com No. IPCOM000166456D, Jan. 11, 2008, pp. 3.

IBM, "Automation of authentication with use of internal and external key parameters", IP.com, IP.com No. IPCOM000180832D, Mar. 18, 2009, pp. 5.

Anonymous, "Provide Java APIs into the IUCV protocol", IP.com, IP.com No. IPCOM000244583D, Dec. 23, 2015, pp. 4.

Wale Amol, D., & Rastogi, V. Data Integrity Auditing of Cloud Storage. International Journal of Computer Applications, Jan. 2016, pp. 5.

A. Vasudevan, et al., "Lockdown: Towards a safe and practical architecture for security applications on commodity platforms", In International Conference on Trust and Trustworthy Computing (pp. 34-54). Springer, Berlin, Heidelberg, Jun. 2012.

J.K Resch, et al. "AONT-RS: Blending Security and Performance in Dispersed Storage Systems", 2017, pp. 12.

A. Buecker, et al. "Reduce Risk and Improve Security on IBM Mainframes: vol. 3 Mainframe Subsystem and Application Security", IBM Corporation, Redbooks, Document No. SG24-8196-00, Nov. 2015, pp. 200.

F.Majstor, Storage Area Networks Security Protocols and Mechanisms', Apr. 2004, pp. 21.

M. Lippett, et al., "Networked Storage Concepts and Protocols", EMC2 Techbooks, EMC Corporation, 2008, pp. 370.

J.Tate, et al., "IBM SAN Survival Guide", IBM Corporation, Redbooks, Document No. SG24-6143-01, Aug. 2003, pp. 662.

"Storage Security: Fibre Channel Security", SNIA, Technical White Paper, Version 1, May 2016, pp. 29.

"Fibre Channel Framing and Signaling—5", INCITS, INCITS working draft proposed American National Standard for Information Technology, Apr. 3, 2018, pp. 506.

"Fibre Channel Link Services Rev 4.04", INCITS, INCITS working draft proposed American National Standard for Information Technology, Jul. 16, 2019, pp. 238.

"Fibre Channel Security Protocols—2", INCITS, INCITS working draft proposed American National Standard for Information Technology, Jun. 12, 2012, pp. 312.

B. Aboba, et al. "Securing Block Storage Protocols over IP", The Internet Society, Apr. 2004, [online][retrieved Aug. 26, 2019] https://tools.ietf.org/html/rfc3723, pp. 70.

Anonymous, "USB Trust Extensions for secured USB devices", IP.com, IP.com No. IPCOM000245301D, Feb. 26, 2016, pp. 8.

"Dell EMC PowerMax Reliability, Availability, and Serviceability Technical White Paper", Dell EMC, Oct. 2018, pp. 32.

"VSphere Security", VMWare, Inc., 2009, pp. 258.

U.S. Appl. No. 16/583,173, filed Sep. 25, 2019.

(56) References Cited

OTHER PUBLICATIONS

U.S. Appl. No. 16/583,178, filed Sep. 25, 2019.
U.S. Appl. No. 16/568,160, filed Sep. 11, 2019.
U.S. Appl. No. 16/568,124, filed Sep. 11, 2019.
U.S. Appl. No. 16/568,131, filed Sep. 11, 2019.
U.S. Appl. No. 16/568,174, filed Sep. 11, 2019.
U.S. Appl. No. 16/568,176, filed Sep. 11, 2019.
English machine translation for CN209057241 dated Dec. 4, 2013, pp. 6.
English machine translation for CN 103425916 dated Dec. 4, 2013, pp. 12.
English machine translation of CN 102063583 dated May 18, 2011, pp. 20.
English machine translation for KR101552950 dated Sep. 14, 2015, pp. 16.
List of IBM Patents and Applications Treated as Related, dated Oct. 23, 2019, pp. 2.
Notice of Allowance 1 for U.S. Appl. No. 16/568,124, dated Sep. 10, 2021, 9 pp. [18.895 (NOA1)].
Notice of Allowance 1 for U.S. Appl. No. 16/568,131, dated Sep. 10, 2021, 9 pp. [18.896 (NOA1)].
Office Action 1 for U.S. Appl. No. 16/568,124, dated May 14, 2021, 21 pp. [18.895 (OA1)].
Response to Office Action 1 for U.S. Appl. No. 16/568,124, dated Aug. 16, 2021, 10 pp. [18.895 (ROA1)].
Office Action 1 for U.S. Appl. No. 16/568,131, dated May 14, 2021, 21 pp. [18.896 (OA1)].
Response to Office Action 1 for U.S. Appl. No. 16/568,131, dated Aug. 16, 2021, 9 pp. [18.896 (ROA1)].
"Information Technology Fibre Channel Part 432: Security Protocols—2", ISO/IEC, downloaded Oct. 17, 2019, pp. 312.
"Understanding FC (and FCoE) fabric configuration in 5 minutes or less", Stevenu, Mar. 20, 2012, pp. 8, [online] [retrieved Aug. 26, 2019] https://blog.osnexus.com/2012/03/20/understanding-fc-fabric-configuration-5-paragraphs/.
U.S. Appl. No. 17/688,550, filed Mar. 7, 2022.
Preliminary Amendment filed Feb. 7, 2022, pp. 26, for U.S. Appl. No. 17/688,550.
List of IBM Patents and Applications Treated as Related, datedMar. 10, 2022, pp. 2.
Boyd, "Method and Hardware for Comprehensive Functional Testing of Interface Controller and Support Circuitry", ip.com, IPCOM000056675D, 2005 (org. 1988), pp. 1-6, (org. p. 276-281) 1988.
Subramani, et al., "Complete Device Level Validation of Solid State Flash Drives—An Approach", IEEE, doi:10.1109/UKSim.2013,pp. 401-406, 2013.
Factor, et al., Capability based Secure Access Control to Networked Storage Devices, IEEE, doi10.1109/MSST.2007.4367968, 2007, pp. 114-128, 2007.
He, et al., "Research on Storage Security Based on Trusted Computing Platform", IEEE, doi:10.1109/SECS.2008.144, 2008, pp. 448-452, 2008.
Thibadeau, et al., "Trusted Computing for Disk Drives and Other Peripherals", IEEE, doi:10.1109/MSP.2006.136, Sep.-Oct. 2006, pp. 8.
Notice of Allowance dated Jan. 20, 2022, pp. 44, for U.S. Appl. No. 16/568,160, filed Sep. 11, 2019.

* cited by examiner

300

Security bit for login in Fibre Channel and enhancement to Fibre Channel via an audit mode indicator Table 59 - Security Bit Applicability

| Service Parameter | Word | Bits | PLOGI and PLOGI LS_ACC Parameter applicability | | FLOGI Parameter applicability | | FLOGI LS_ACC Parameter applicability | |
|---|---|---|---|---|---|---|---|---|
| | | | Class | | Class | | Class | |
| | | | 2 | 3 | 2 | 3 | 2 | 3 |
| Common Features | 1 | 31..16 | | | | | | |
| Security Bit — 302 | 1 | 21 | y | y | y | y | y | y |

Key:
y - indicates yes, applicable (i.e. has meaning);
n - indicates no, not applicable (i.e. has no meaning)

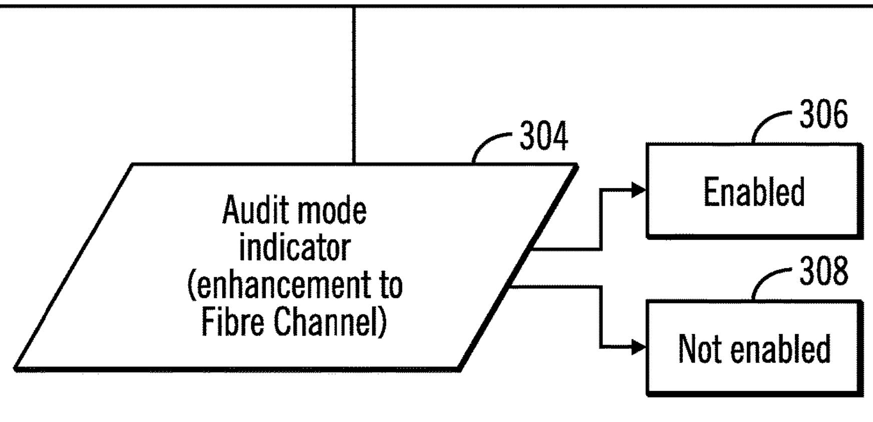

FIG. 3

MAINTENANCE OF ACCESS FOR SECURITY ENABLEMENT ON A HOST SYSTEM

BACKGROUND

1. Field

Embodiments relate to the maintenance of access for security enablement on a host system.

2. Background

Fibre Channel refers to an integrated set of architectural standards for data transfer developed by the American National Standards Institute (ANSI). Security solutions for the Fibre Channel architecture are provided by Fibre Channel Security Protocols (FC-SP) developed by ANSI. FC-SP provides mechanisms for device authentication, per message security, policy distributions, etc., in a Fibre Channel environment. Further details of FC-SP are provided in the publication "Fibre Channel Security Protocols-2 (FC-SP-2)", Revision 2.71, published on Jun. 12, 2012 by ANSI.

FC-LS-4 provides mechanisms for link services in Fibre Channel and further details are provided in the publication "Fibre Channel Link Services (FC-LS-4)", Revision 4.04, published on Jul. 16, 2019 by ANSI. FC-FS-5 provides mechanisms for framing and signaling in Fibre Channel and further details are provided in the publication "Fibre Channel Framing and Signaling-5 (FC-FS-5)", Revision 1.0, published on Apr. 3, 2018 by ANSI.

In a Fibre Channel environment, to provide for secure and encrypted communication between nodes in a Fabric, a Security Association (SA) management transaction occurs between a SA_Initiator and a SA_Responder using a security establishment protocol. The initiator and responders may comprise ports in adaptors in devices in a Fibre Channel network. Separate security associations are established for data transmission and data reception at a port. Completion of the SA establishment transaction results in a set of security associations and related key material used to encrypt/decrypt data communication between the initiator and the responder under the established security association. An example of a security association protocol is the Security Association Management protocol in FC-SP-2. The protocol is comprised of a pair of messages, SA_Init and SA_Init Response to establish a parent association followed by a pair of messages, SA_Auth and SA_Auth Response to perform authentication of the entitles and establish the Security Associations that protect the data transferred between the entities.

A storage controller may control access to storage for one or more host computational devices that may be coupled to the storage controller over a Fibre Channel network. A storage management application that executes in the storage controller may manage a plurality of storage devices, such as disk drives, tape drives, flash drives, direct access storage devices (DASD), etc., that are coupled to the storage controller. A host computational device may send Input/Output (I/O) commands to the storage controller and the storage controller may execute the I/O commands to read data from the storage devices or write data to the storage devices. The communication between the hosts and the storage controller occur via Fibre channel ports located on adapters in the hosts and the storage controller.

US patent publication 20100154053 discusses a storage security mechanism using cryptographic splitting. US patent publication 20190251282 discusses a cyber security mechanism for transferring data between servers. US patent publication 20160139845 discusses storage level access control for data grouping structures. US patent publication 20160378691 discusses mechanisms for protecting a storage against an attack. U.S. Pat. No. 8,275,950 discusses a Fiber Channel Connection storage controller that may manage the one-to-one correspondence of ports of the host computers and the storage controller using a log-in request control table to prevent any unauthorized access attempts from host computers on a port-by-port basis thereby maintaining enhanced security. U.S. Pat. No. 6,219,771 discusses a data storage apparatus with improved security process and partition allocation functions. US patent publication 20040107342 discusses a secure network file access control system. European patent application EP1276034A2 discusses security for logical unit in a storage subsystem. US patent publication 20160342798 discusses a system and method for protected device management. U.S. Pat. No. 8,799,436 discusses a system and method for auditing and verifying configuration items in an information technology (IT) configuration management database.

SUMMARY OF THE PREFERRED EMBODIMENTS

Provided are a method, a system, a computer program product in which a host port is enabled for security. In response to a determination by the host port that authentication or security association negotiation with a storage port cannot be completed successfully, the host port determines whether an audit mode indicator has been enabled in a login response from the storage port. The host port preserves input/output (I/O) access to the storage port based on determining whether the audit mode indicator has been enabled in the login response from the storage port. As a result, a host port may be able to perform I/O via a storage port even if authentication or security association negotiation with a storage port cannot be completed successfully.

In further embodiments, the host port performs I/O to the storage port, in response to determining that the audit mode indicator has been enabled in the login response from the storage port. As a result, a host port performs I/O via a storage port even if authentication or security association negotiation with a storage port cannot be completed successfully when the audit mode indicator has been enabled.

In additional embodiments, the host port avoids performing I/O to the storage port, in response to determining that the audit mode indicator has not been enabled in the login response from the storage port. As a result, a host port does not perform I/O via a storage port if authentication or security association negotiation with a storage port cannot be completed successfully and the audit mode indicator has not been enabled.

In additional embodiments, the host port returns I/O requests to an operating system of a host computational device, in response to determining that the audit mode indicator has not been enabled in the login response from the storage port. As a result, alternative mechanisms are tried for performing I/O, if authentication or security association negotiation with a storage port cannot be completed successfully and the audit mode indicator has not been enabled.

In further embodiments, the host port determines that authentication or security association negotiation with the storage port cannot be completed successfully if the host port is unable to access a key server to obtain credentials to authenticate with the storage port. As a result, the host port may take further action to determine a status of the audit indicator to determine whether to send I/O requests to the storage port.

In additional embodiments, the host port determines that authentication or security association negotiation with a storage port cannot be completed successfully if there is a failure in a process for the authentication or the security association negotiation with the storage port. As a result, the host port may take further action to determine a status of the audit indicator to determine whether to send I/O requests to the storage port.

In further embodiments, the audit mode indicator is enabled via an indication in auxiliary parameter data word 0, bit 23 in programs that implement Fibre Channel Link Services. As a result, enhancements are made to Fibre Channel to augment operations that are based on the security bit provided by Fibre Channel.

BRIEF DESCRIPTION OF THE DRAWINGS

Referring now to the drawings in which like reference numbers represent corresponding parts throughout:

FIG. 3 illustrates a block diagram that shows a security bit for login in Fibre Channel and an enhancement to Fibre Channel via an audit mode indicator, in accordance with certain embodiments;

DETAILED DESCRIPTION

Figure 1:
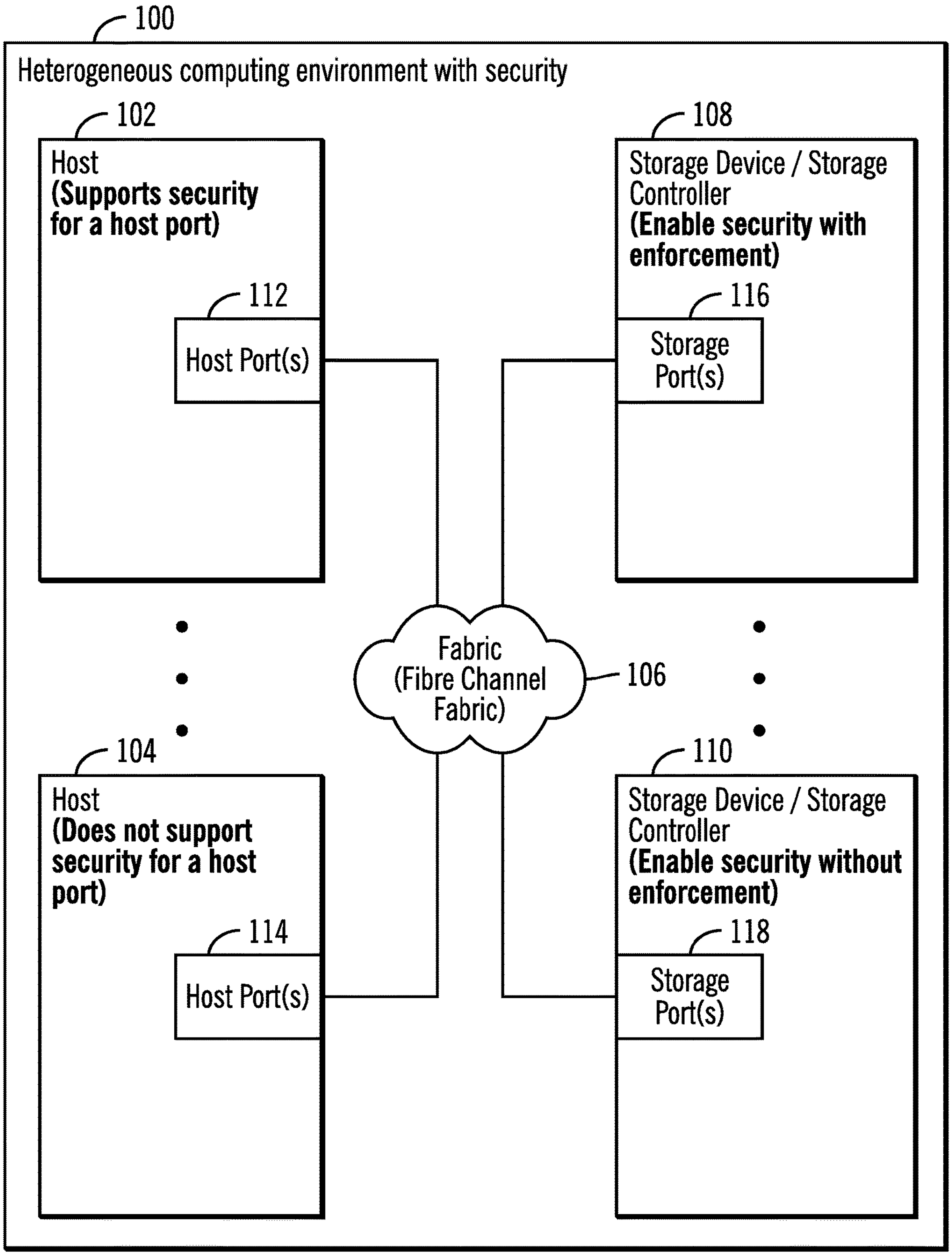
FIG. 1 illustrates a block diagram of a heterogeneous computing environment comprising a plurality of hosts that communicate over a Fibre Channel Fabric to a plurality of storage controllers and/or storage devices, in accordance with certain embodiments.

In the following description, reference is made to the accompanying drawings which form a part hereof and which illustrate several embodiments. It is understood that other embodiments may be utilized and structural and operational changes may be made.

The standard for encrypting Fibre Channel links (FC-SP-2) includes protocols for mutual authentication of the two endpoints (i.e., ports) as well as protocols for negotiating encryption keys that are used in communication sessions between the two endpoints. The standard provides support for a variety of mechanisms to authenticate the involved parties and as well as mechanisms by which key, material is provided or developed.

In the FC-SP-2 standard, support for authentication within an endpoint is indicated by the setting of the Security Bit of the Common Service parameters passed to the peer during the login process. When set to a value of one in the login request, the Security Bit indicates that the sending port is able to perform authentication. When the responding port accepts the login request, if in the reply it also sets the Security Bit to one then this indicates that the responding port requires the sender of the login to now perform authentication before granting any further access.

The FC-SP-2 standard specifies the behavior of the responding endpoint in terms of the acceptance or rejection of the login request and the setting of the Security Bit based on security policy in effect at that endpoint at the time the request is received. The standard makes no provision for how this policy is instantiated at the responding endpoint. In an enterprise datacenter, care needs to be taken to protect access to data as well as provide security for the data. When enabling security in a heterogeneous environment containing some systems and storage ports that do not support security (e.g., legacy ports), certain embodiments provide mechanisms to ensure that connectivity is not lost, in contrast to current standards that do not allow for such mechanisms to be provided.

Certain embodiments provide a mechanism to enable security at a host in an "audit mode" in which access to data by a host is not lost when security is enabled in a storage device. An indication is provided via a setting of an audit mode indicator at the time of login that allows a host port to continue to access a storage port after security is enabled. Once authentication and enablement of security mechanisms is verified to have been completed successfully, security enablement may be changed to a policy of security enforcement. Security enablement means that I/O can be performed even if authentication and enablement of security mechanisms have not completed successfully, while security enforcement means that I/O cannot be performed if authentication and enablement of security mechanisms have not completed successfully. While in audit mode, a host may continue to access the storage device and provide tools to audit the security state of connections.

Certain embodiments provide a mechanism in which a host determines that the authentication and/or security association cannot be successfully completed with a storage device, and then uses the audit mode indicator to check if security is not enforced on the storage port. If the audit mode indicator is set, the host processor continues sending I/O operations to the storage device along the selected port. If the audit mode indicator is not set, then the host processor ceases I/O operations to the storage device and notifies the host application or operating system to find an alternate path to complete the I/O operations.

Additionally, in Fibre Channel, many host ports may login (as described in FC•FS•5) to a single storage port. Some of these host ports may support security and some may not. If a port setting is set to security enforced, the host ports that do not support security may lose access to the storage port as these host ports are not allowed to login.

In certain embodiments, information is provided by the storage device to show the number of current logins to each of its ports. For that number of logins, the storage device provides the number of security capable logins, and the number of logins that are successfully authenticated and have enabled security. From this information, it can be determined whether or not access could be lost to a port if the storage port setting is changed to security enforced. Once all logins are determined to be secure, the setting may be changed without access loss as all host ports are able to successfully enable security. In certain embodiments, when the setting is desired to be changed to enforce security, the storage device checks login counters to determine if an access loss could occur (i.e., there are logins that are not successfully authenticated) and prevents the setting from being changed to enforce security.

Certain embodiments provide a storage port that supports a setting to enable security without enforcement, and that provides auditable statistics (e.g., login counts, security capable login count, and security enabled login counts) for determining effects of setting security to enforcement. An audit mode indicator is set in a login response to the host port, indicating that I/O can be sent to this storage port even if authentication cannot be completed successfully. The setting of enabled or enforced for security, may be performed on a storage array or on individual storage port basis.

In certain embodiments, provided is a setting for security enforcement having automated checking of the login indicators to prevent changing the setting if access loss could occur. An option to force the setting to security enforcement without regard to login indicators is also provided.

As a result improvements are made to devices to maintain connectivity for performing I/O, in an enhancement to a Fibre Channel based connectivity environment.

EXEMPLARY EMBODIMENTS

FIG. 1 illustrates a block diagram 100 of a heterogeneous computing environment comprising a plurality of hosts 102, 104 that communicate over a Fibre Channel Fabric 106 to a plurality of storage controllers and/or storage devices 108, 110, in accordance with certain embodiments. Both storage controllers and storage devices are shown via reference numeral 108, 110, and the hosts 102, 104 may communicate with storage controllers that control storage devices, or may communicate with storage devices without involvement of any storage controller. A storage controller may also be regarded as an advanced type of storage device since it controls and allows access to one or more storage devices to one or more hosts.

The hosts 102, 104 and the storage controllers 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. Storage devices may include storage device presently known in the art, such as hard disk drives, tape drives, solid state drives, etc.

The hosts 102, 104 and the storage devices 108, 110 may be elements in any suitable network, such as, a storage area network, a wide area network, the Internet, an intranet. In certain embodiments, the hosts 102, 104 and the storage devices 108, 110 may be elements in a cloud computing environment. The connectivity between the hosts 102, 104 and the storage devices 108, 110 in the network and/or cloud computing environment may be over the Fibre Channel Fabric 106.

A host may include one or more host ports. For example, host 102 includes a plurality of host ports 112, and host 104 includes a plurality of host ports 114. A storage device may include a plurality of storage ports. For example, storage device 108 includes a plurality of storage ports 116, and storage device 110 includes a plurality of storage ports 118. The host ports 112, 114 and the storage ports 116, 118 may be in communication over the Fibre Channel Fabric 106.

In certain embodiments, not all hosts support security for host ports. For example, certain legacy hosts may not support security for host ports in Fibre Channel, or certain legacy adapters in hosts may not support security for host ports in Fibre Channel. For example, host 102 is shown as supporting security for a host port, and host 104 is shown as not supporting security for a host port.

In certain embodiments, certain storage devices may enable one or more storage ports to be configured as enabling security with enforcement (i.e., I/O may not occur from a host port to a storage port unless secure connectivity has been verified as being completed between the host port and the storage port). In certain embodiments, certain storage devices may enable one or more storage ports to be configured as enabling security without enforcement (i.e., I/O may occur from a host port to a storage port even if secure connectivity has not been verified as being completed between the host port and the storage port). For example, storage device 108 may have enabled security with enforcement for at least one of the storage ports 116 (other storage ports in the storage device 108 may have enabled security without enforcement). In FIG. 1, storage device 110 may have enabled security without enforcement for at least one of the storage ports 118 (other storage ports in the storage device 110 may have security enabled with enforcement).

Therefore FIG. 1 shows certain embodiments that allow I/O operations to be sent from a host port to a storage port even if authentication or security association negotiation between and host port and a storage port cannot be completed successfully.

Figure 2:
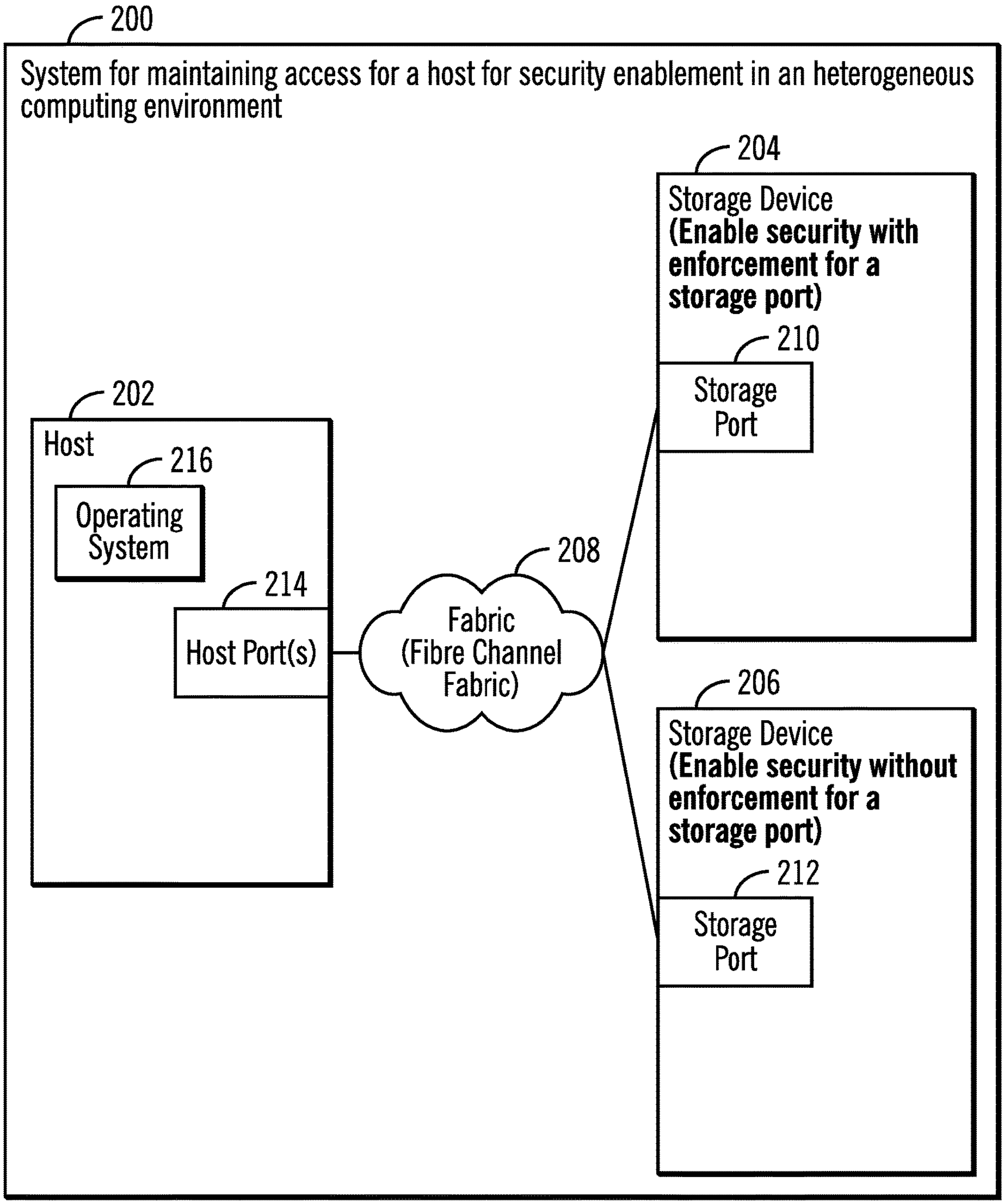
FIG. 2 illustrates a block diagram of a system for maintaining access for a host for security enablement in a heterogeneous computing environment, in accordance with certain embodiments.

FIG. 2 illustrates a block diagram 200 of a system for maintaining access for a host 202 for security enablement in a heterogeneous computing environment, in accordance with certain embodiments.

The host 202 is communicatively coupled to a plurality of storage devices 204, 206 via a Fibre Channel Fabric 208. The storage device 204 has enabled security with enforcement for storage port 210 of the storage device 204, and the storage device 206 has enabled security without enforcement for storage port 212 of the storage device 206. In certain embodiments, a storage port may be changed from enabling security without enforcement to enabling security with enforcement and vice versa.

The host 202 includes a host port 214, where the host port 214 is in communication with the storage ports 210, 212. In the embodiments shown in FIG. 2, the host port 214 is able to transmit I/O to the storage port 212 even if authentication or security association negotiation between the host port 214 and the storage port 212 cannot be completed successfully, because the storage port 212 has enabled security without enforcement. However, the host port 214 is unable to transmit I/O to the storage port 210 if authentication or security association negotiation between the host port 214 and the storage port 210 cannot be completed successfully, because the storage port 210 has enabled security with enforcement.

In case the host port 214 is unable to transmit I/O operation to a storage port, then the operating system 216 of the host 202 attempts to transmit the I/O operation via another mechanism.

FIG. 3 illustrates a block diagram 300 shows a security bit 302 for login in current Fibre Channel standards and an enhancement to Fibre Channel via an audit mode indicator 304, in accordance with certain embodiments. The audit mode indicator 304 may be enabled (reference numeral 306) or not enabled (reference numeral 308).

It should be noted that the audit mode indicator 304 is not found in existing Fibre Channel standards. The enablement of the audit mode indicator 304 allows enablement of security without enforcement to work in cooperation with the configuration of the security bit 302.

In certain embodiments, the audit mode indicator 304 is enabled via an indication in auxiliary parameter data word 0, bit 23 in programs that implement Fibre Channel Link Services (FC-LS-4). Other mechanisms to implement the audit mode indicator 304 may be provided in other embodiments. The audit mode indicator 304 and the security bit 302 may be part of one or more data structures that are used for performing operations.

Figure 4:
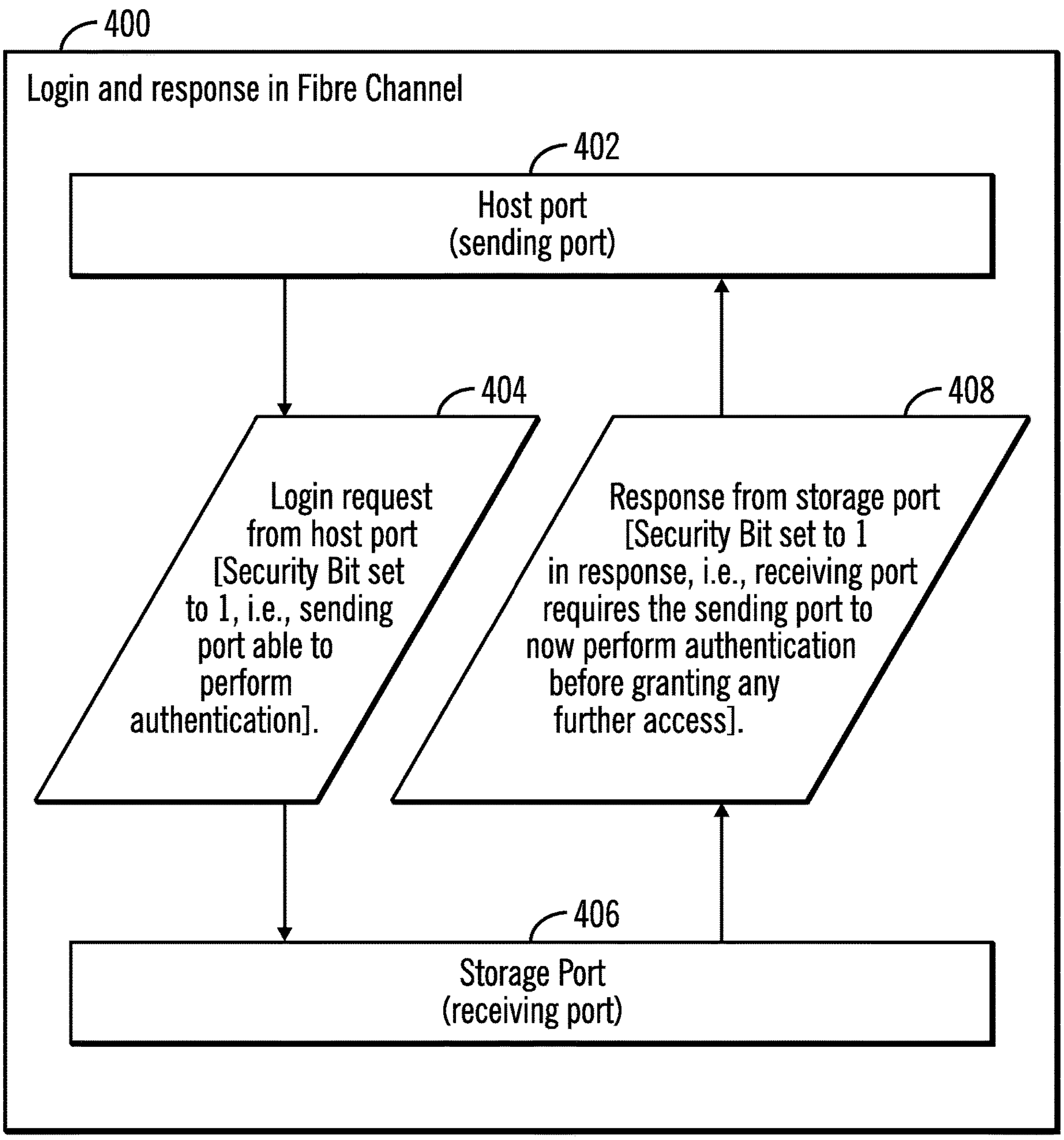
FIG. 4 illustrates a block diagram that shows a login and a response in Fibre Channel, in accordance with certain embodiments.

FIG. 4 illustrates a block diagram 400 that shows a login and a response in Fibre Channel, in accordance with certain embodiments. A host port 402 transmits a login request 404 to a storage port 406. The host port 402 is also referred to as a "sending port" and the storage port 406 is also referred to as a "receiving port".

In the login request 404 from the host port 402, the security bit 302 is set to one to indicate that the sending port (i.e., the host port 402) is able to perform authentication.

On receiving the login request 404, the storage port 406 sends a response 408 to the host port 402. The response 408 from the storage port 406 may set the security bit 302 to one to indicate that the receiving port (i.e., the storage port 406) requires the sending port (i.e., the host port 402) to now perform authentication before granting any further access.

In certain embodiments, even if the security bit 302 is set to one in the response, if the audit mode indicator 304 is enabled (i.e., set) to indicate security enabled without enforcement, then the requirement to complete authentication before granting any further access is overridden.

Figure 5:
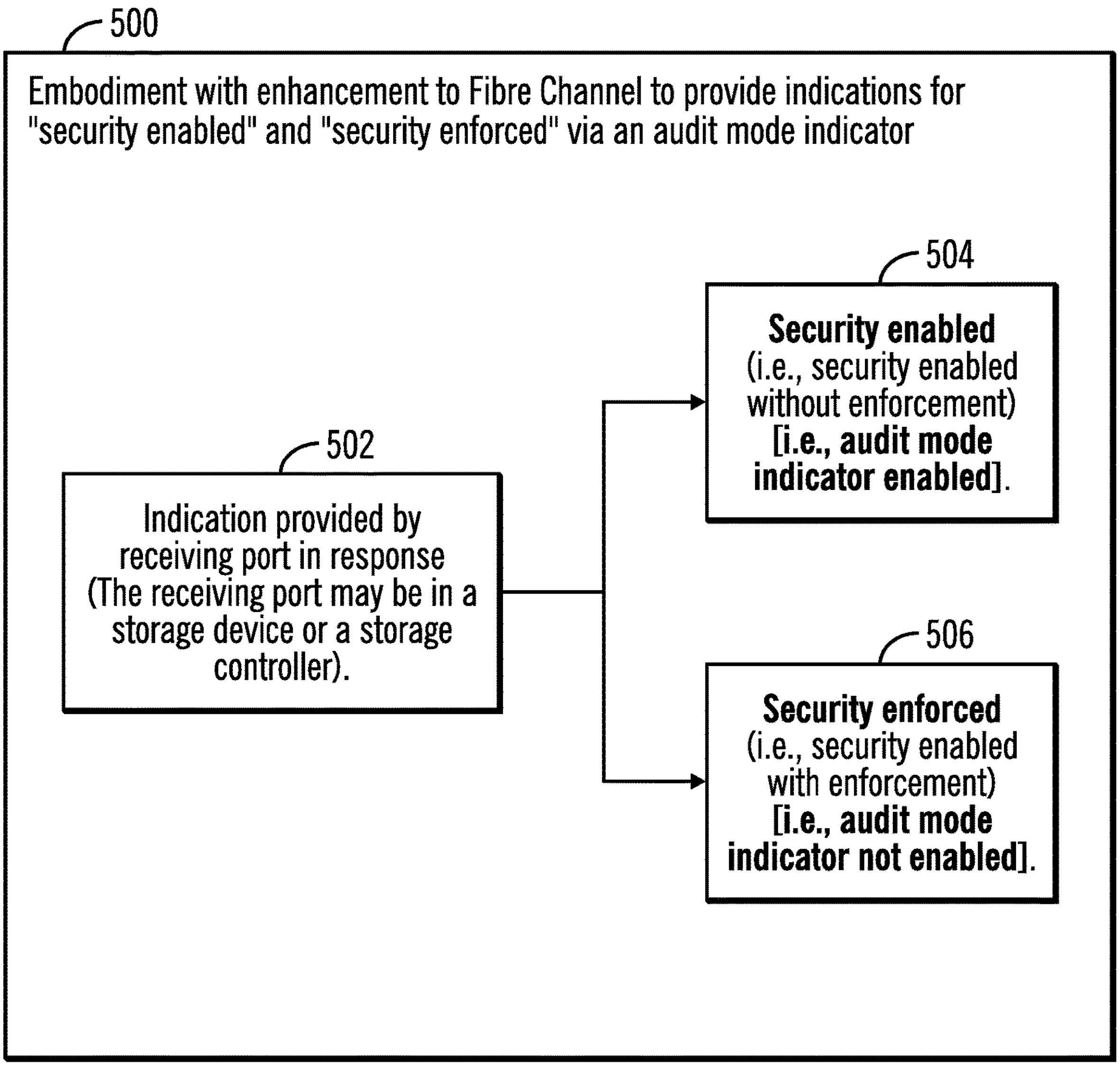
FIG. 5 illustrates a block diagram than shows an enhancement to Fibre Channel to provide indications for "security enforced" and "security enabled" via enablement or non-enablement of an audit mode indicator, in accordance with certain embodiments.

FIG. 5 illustrates block diagram 500 that shows an enhancement to Fibre Channel to provide indications for "security enforced" and "security enabled" via enablement or non-enablement of an audit mode indicator 304, in accordance with certain embodiments.

Indications are provided by a receiving port (e.g. a storage port in a storage device) in the response to a login request from a host post (as shown via reference numeral 502). The indications may be provided via configuration of the audit mode indicator 304. The configuration of the audit mode indicator 304 as enabled may result in a state of a storage port being "security enabled" 504 which means that security is enabled without enforcement. Not enabling the configuration of the audit mode indicator 304 may result in a state of a storage port being "security enforced" 506 which means that security is enabled with enforcement.

Figure 6:
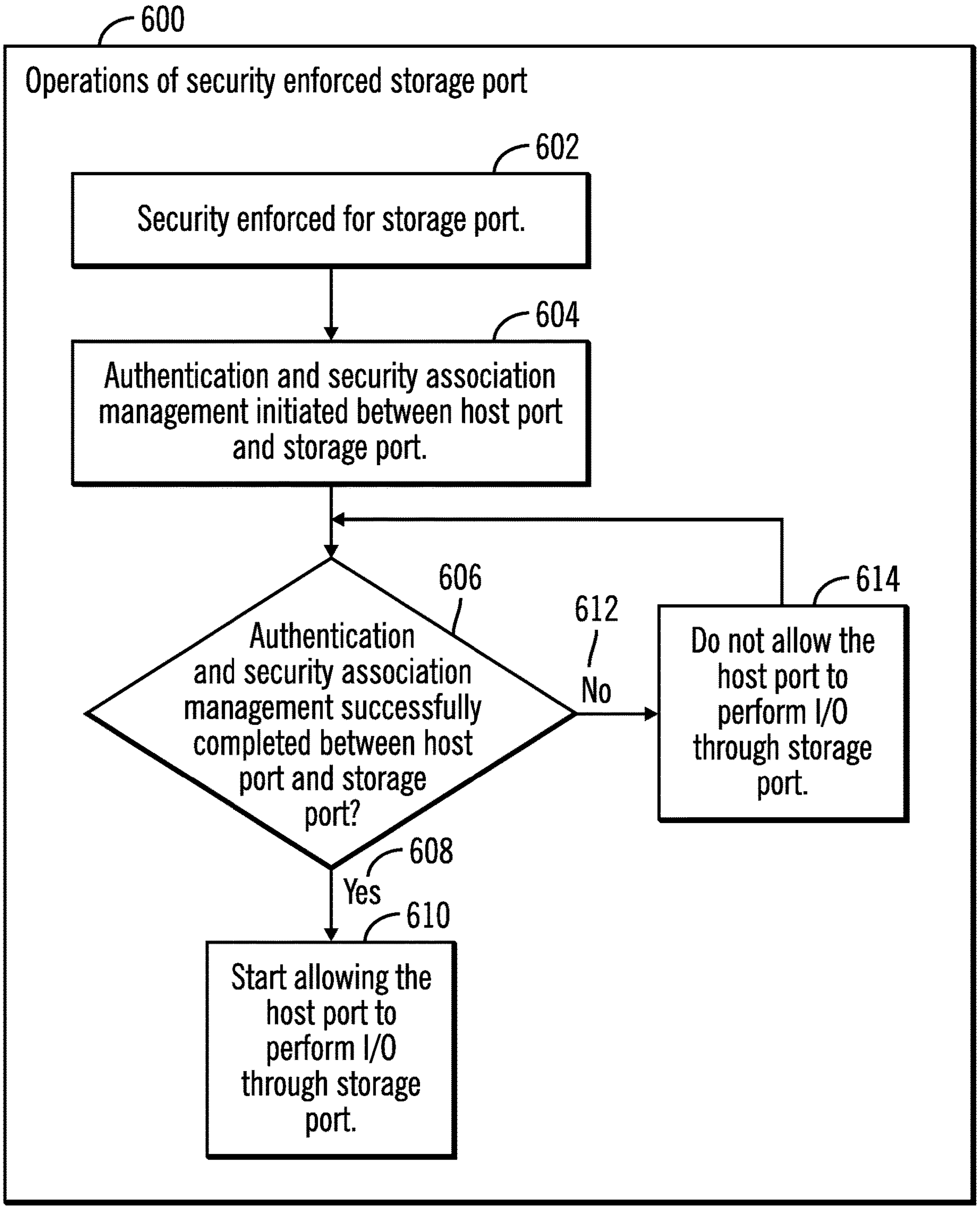
FIG. 6 illustrates a flowchart that shows operations of a security enforced storage port, in accordance with certain embodiments.

FIG. 6 illustrates a flowchart 600 that shows operations of a security enforced storage port, in accordance with certain embodiments. Control proceeds to block 604 in which authentication and security association management is initiated between a host port and the storage port. Control proceeds to block 606 in which a determination is made as to whether authentication and security association management has successfully completed between the host port and the storage port. If so ("Yes" branch 608) control proceeds to block 610 in which the host port is allowed to start performing I/O through the storage port (at block 610). If not ("No" branch 612), control proceeds to block 614 in which the host port is prevented from performing I/O through the storage port.

Figure 7:
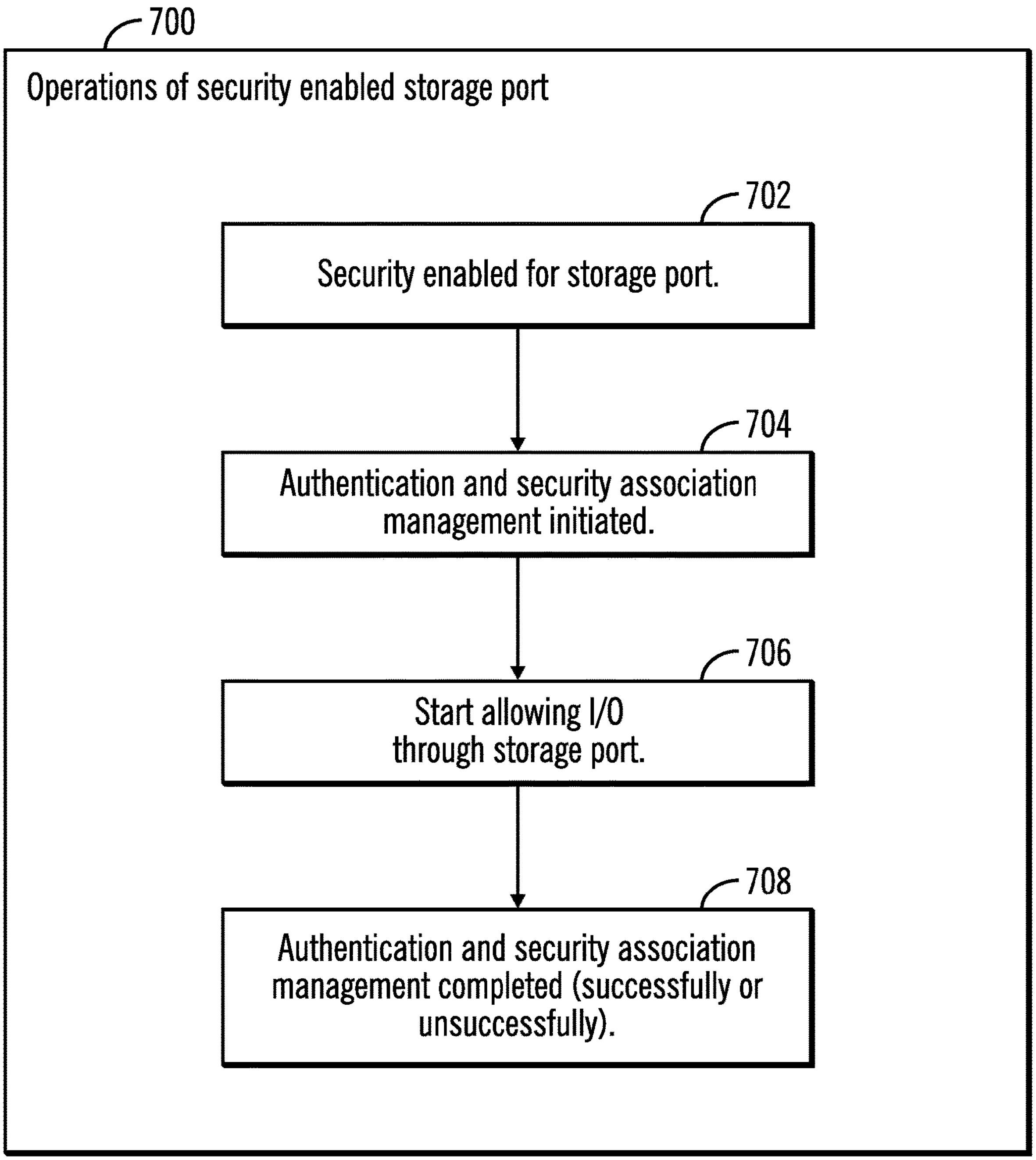
FIG. 7 illustrates a flowchart that shows operations of a security enabled storage port, in accordance with certain embodiments.

FIG. 7 illustrates a flowchart 700 that shows operations of a security enabled storage port, in accordance with certain embodiments.

Control starts at block 702 in which security is enabled for a storage port. Control proceeds to block 704 in which authentication and security association management is initiated between a host port and the storage port. The host port is allowed to perform I/O through the storage port (block 706) irrespective of whether or not the authentication and security association management operation completes successfully or unsuccessfully (at block 708). The time at which the I/O starts being allowed may differ in different embodiments.

Figure 8:
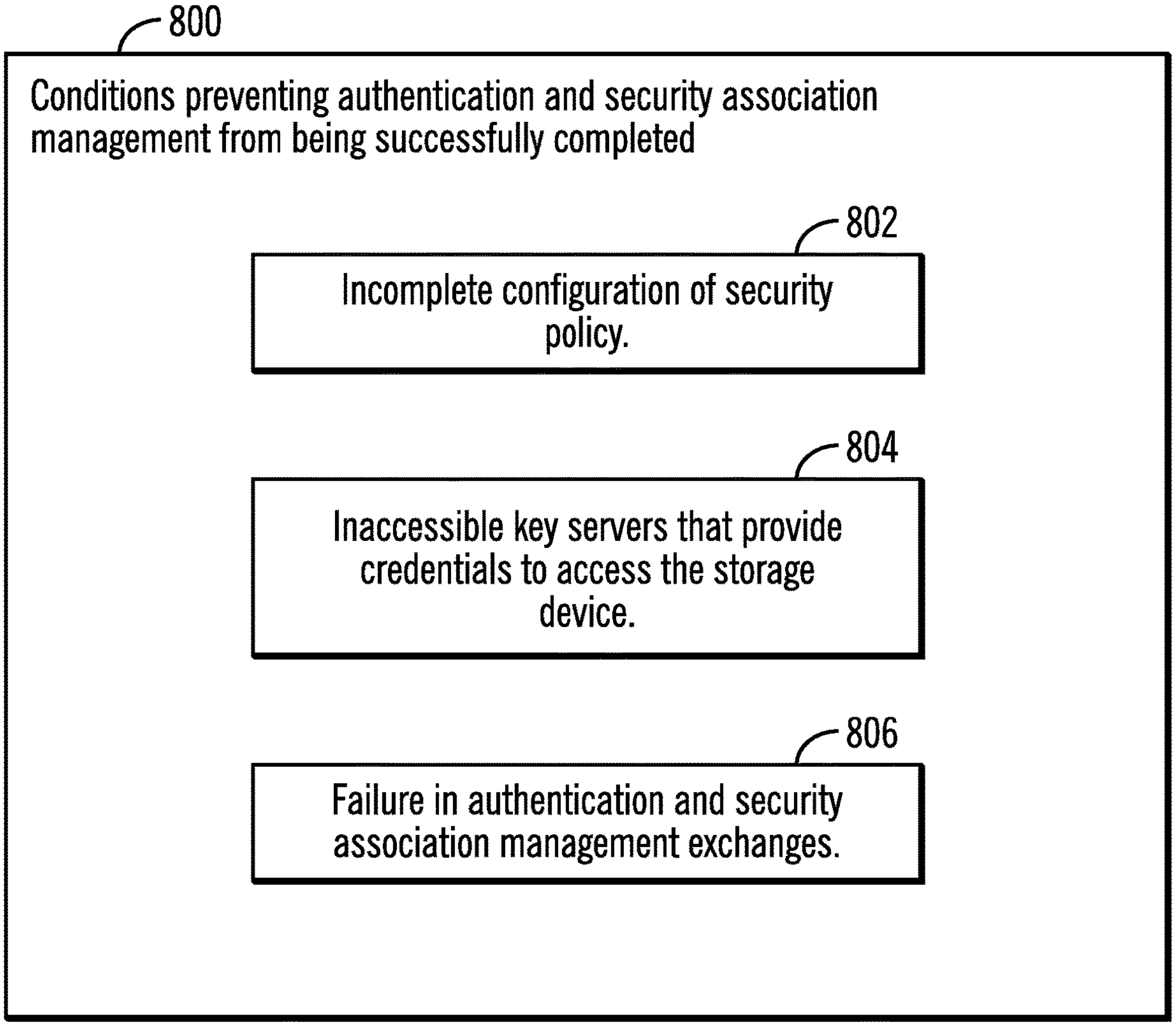
FIG. 8 illustrates a block diagram that shows conditions preventing authentication and security association management from being successfully completed, in accordance with certain embodiments.

FIG. 8 illustrates a block diagram 800 that shows conditions preventing authentication and security association management from being successfully completed, in accordance with certain embodiments.

A first condition 802 is an incomplete configuration of security policy that may prevent authentication and security association management from being successfully completed. A second condition 804 comprises inaccessible key servers that provide credentials to access the storage device that may prevent authentication and security association management from being successfully completed. A third condition 806 is a failure in authentication and security association management exchanges that may prevent authentication and security association management from being successfully completed. All these conditions may cause the authentication and security association management from being successfully completed in the operations shown in FIGS. 6 and 7.

Figure 9:
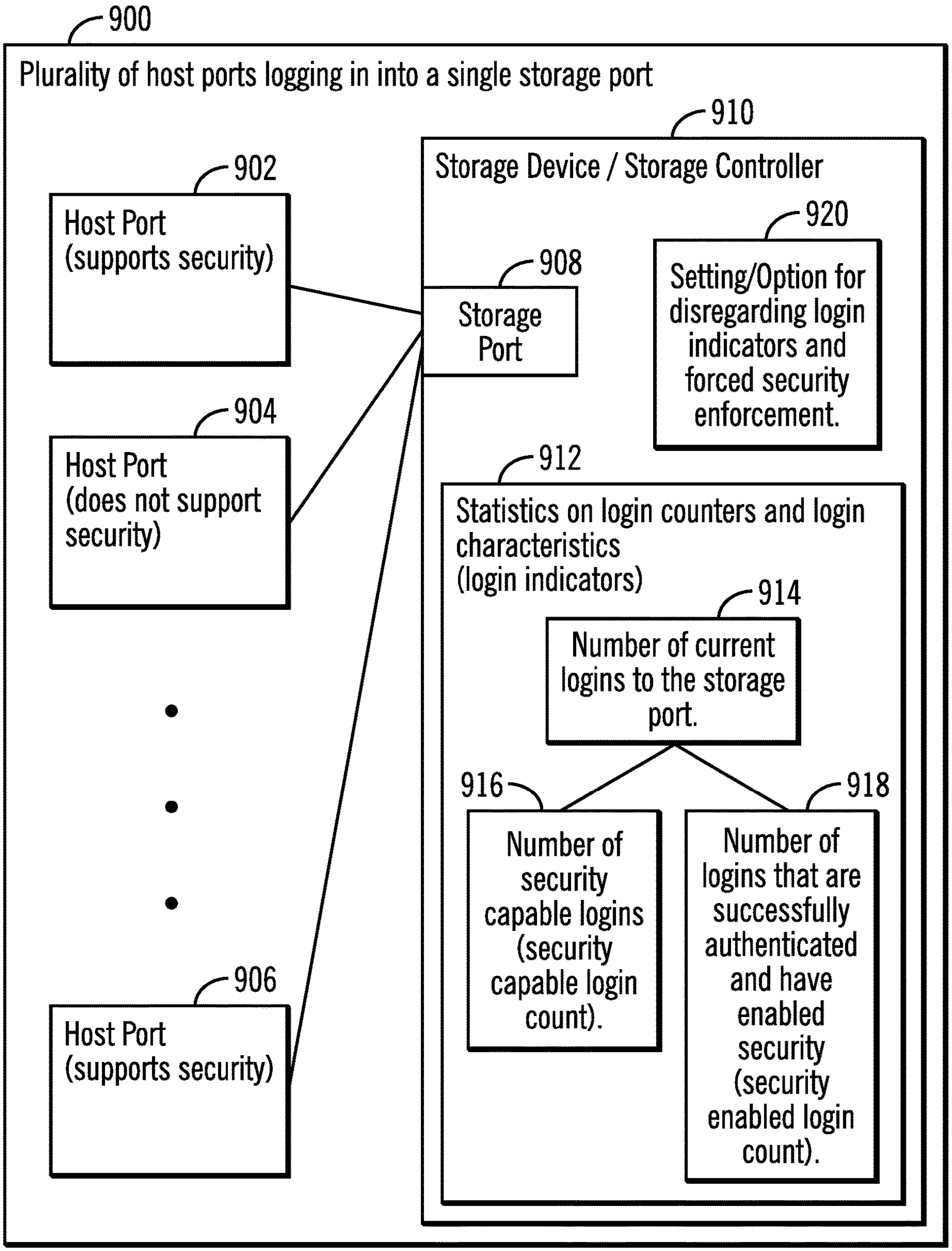
FIG. 9 illustrates a block diagram that shows a plurality of host ports logging in into a single storage port, in accordance with certain embodiments.

FIG. 9 illustrates a block diagram 900 that shows a plurality of host ports 902, 904, 906 logging in into a single storage port 908, in accordance with certain embodiments. The single storage port 908 may be included in a storage device or storage controller 910, where the storage device or storage controller 910 may have other storage ports.

In FIG. 9, the host ports 902 and 906 support security, whereas the host port 904 does not support security as it may be included in a legacy adapter or a legacy host or for some other reason including configuration by an administrator.

The storage device or storage controller 910 maintains statistics on login counters and login characteristics referred to as login indicators (reference numeral 912). The statistics include: a number of current logins to the storage port (reference numeral 914); a number of security capable logins counts to the storage port (reference numeral 916); and a number of security enabled login counts to the storage port (reference numeral 918). The security enabled login are those that have successfully authenticated and have enabled security.

In certain embodiments, the statistics on login counters and login characteristics 912 are used by the storage device or storage controller 910 for determining an effect on I/O access by hosts if the security enforced mode is configured. In additional embodiments, the statistics on login counters and login characteristics 912 are used by the storage device or storage controller to prevent a switchover to the security enforced mode from the security enabled mode if an I/O access is to be lost by a host on switchover to the security enforced mode.

In further embodiments, the storage device or storage controller 910 provides an option 920 to force switchover to the security enforced mode without consideration of the statistics on login counters and login characteristics 912.

Figure 10:
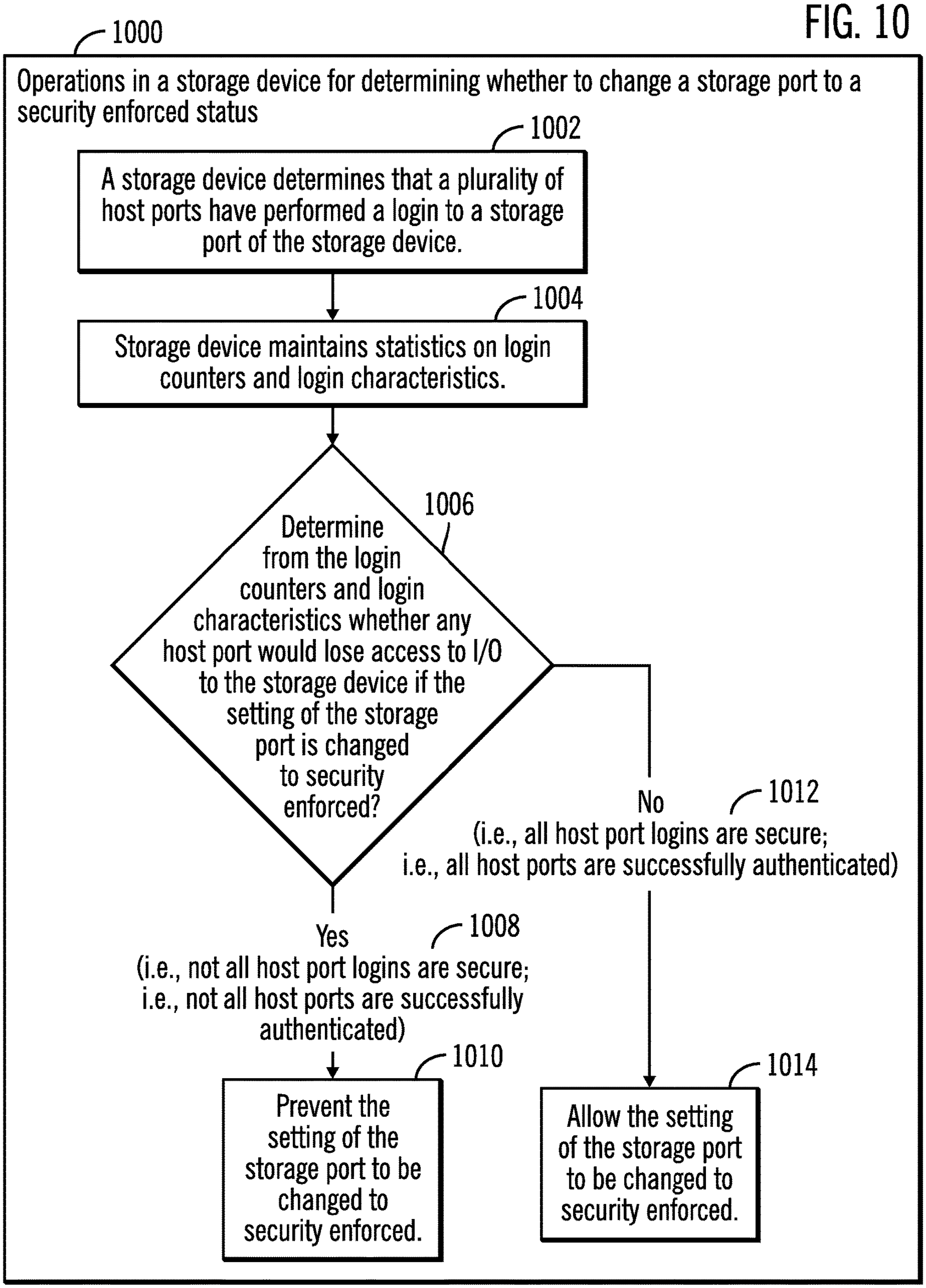
FIG. 10 illustrates flowchart that shows operations in a storage device for determining whether to change a storage port to a security enforced status, in accordance with certain embodiments, in accordance with certain embodiments.

FIG. 10 illustrates flowchart 1000 that shows operations in a storage device for determining whether to change a storage port to a security enforced status, in accordance with certain embodiments, in accordance with certain embodiments.

Control starts at block 1002 in which a storage device determines that a plurality of host ports have performed a login to a storage port of the storage device. Control proceeds to block 1004 in which the storage device maintains statistics on login counters and login characteristics. The storage device determines (at block 1006) from the login counters and login characteristics whether any host port would lose access to I/O to the storage device if the setting of the storage port is changed to security enforced. If so ("Yes" branch 1008), not all host ports logins are secure (i.e., not all host ports are successfully authenticated) and control proceeds to block 1010 in which the setting of the storage port is prevented from being changed to security enforced.

If at block 1006 the storage device determines from the login counters and login characteristics that no host port would lose access to I/O to the storage device if the setting of the storage port is changed to security enforced ("No" branch 1012) then all host port logins are secure (i.e., all host ports are successfully authenticated) and control proceeds to block 1014 in which the setting of the storage port is allowed to be changed to security enforced.

Figure 11:
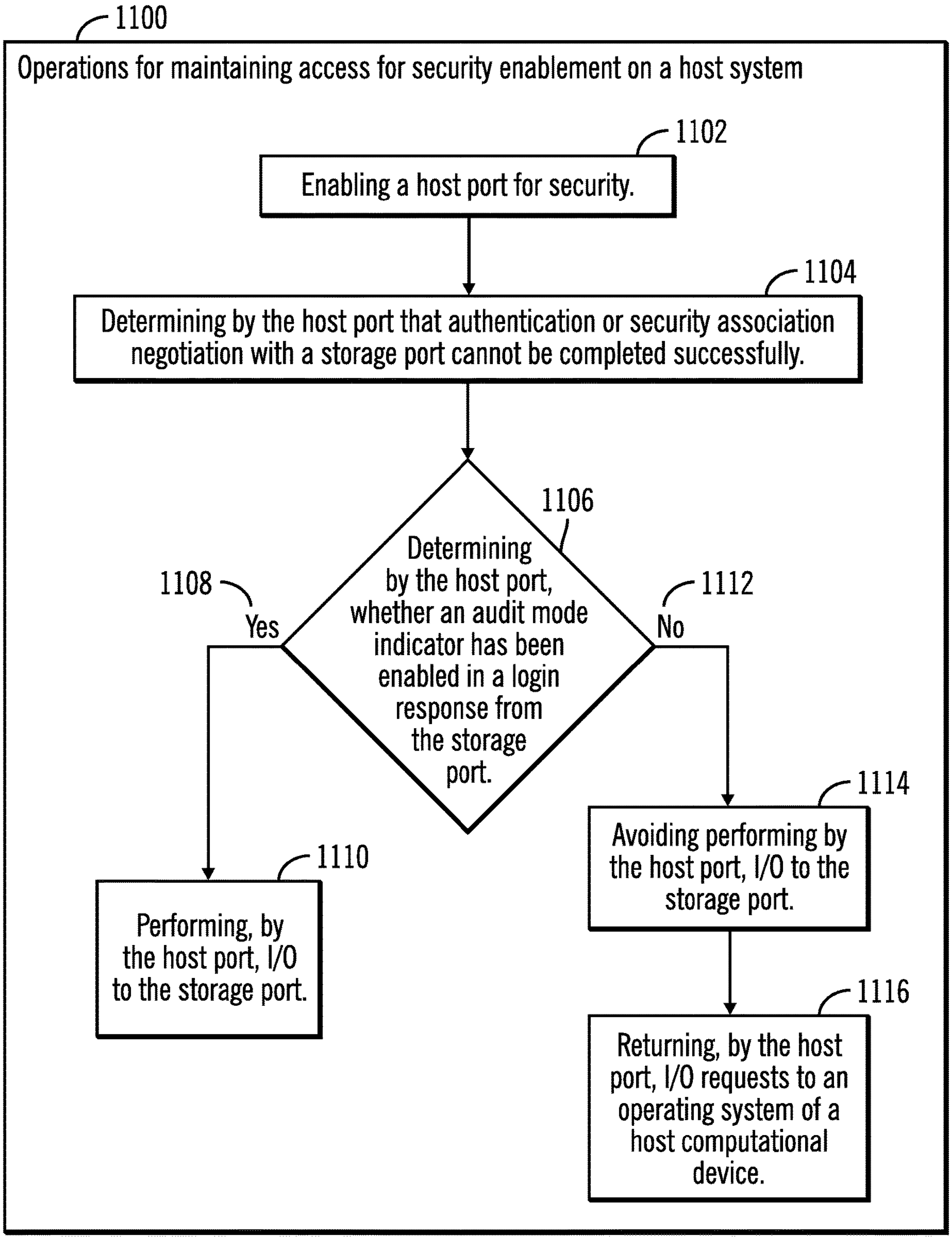
FIG. 11 illustrates flowchart that shows operations for maintaining access for security enablement on a host system, in accordance with certain embodiments, in accordance with certain embodiments.

FIG. 11 illustrates flowchart 1100 that shows operations for maintaining access for security enablement on a host system, in accordance with certain embodiments, in accordance with certain embodiments.

Control starts at block 1102 in which a host port is enabled for security. A determination is made (at block 1104) by the host port that authentication or security association negotiation with a storage port cannot be completed successfully.

In response to a determination by the host port that authentication or security association negotiation with a storage port cannot be completed successfully, the host port determines (at block 1106) whether an audit mode indicator has been enabled in a login response from the storage port. The host port preserves input/output (I/O) access to the storage port based on determining whether the audit mode indicator has been enabled in the login response from the storage port. As a result, a host port may be able to perform I/O via a storage port even if authentication or security association negotiation with a storage port cannot be completed successfully.

In response to determining that the audit mode indicator has been enabled in the login response from the storage port ("Yes" branch 1108), the host port performs (at block 1110) I/O to the storage port. Performing I/O to the storage port means sending an I/O operation to the storage port for performing an I/O operation in which data is read or written or accessed. As a result, a host port performs I/O via a storage port even if authentication or security association negotiation with a storage port cannot be completed successfully when the audit mode indicator has been enabled.

In response to determining that the audit mode indicator has not been enabled in the login response from the storage port ("No" branch 1112), the host port avoids (at block 1114) performing I/O to the storage port. As a result, a host port does not perform I/O via a storage port if authentication or security association negotiation with a storage port cannot be completed successfully and the audit mode indicator has not been enabled. From block 1114 control proceeds to block 1116 in which the host port returns I/O requests to an operating system of a host computational device. As a result, alternative mechanisms are tried for performing I/O, if authentication or security association negotiation with a storage port cannot be completed successfully and the audit mode indicator has not been enabled.

Figure 12:
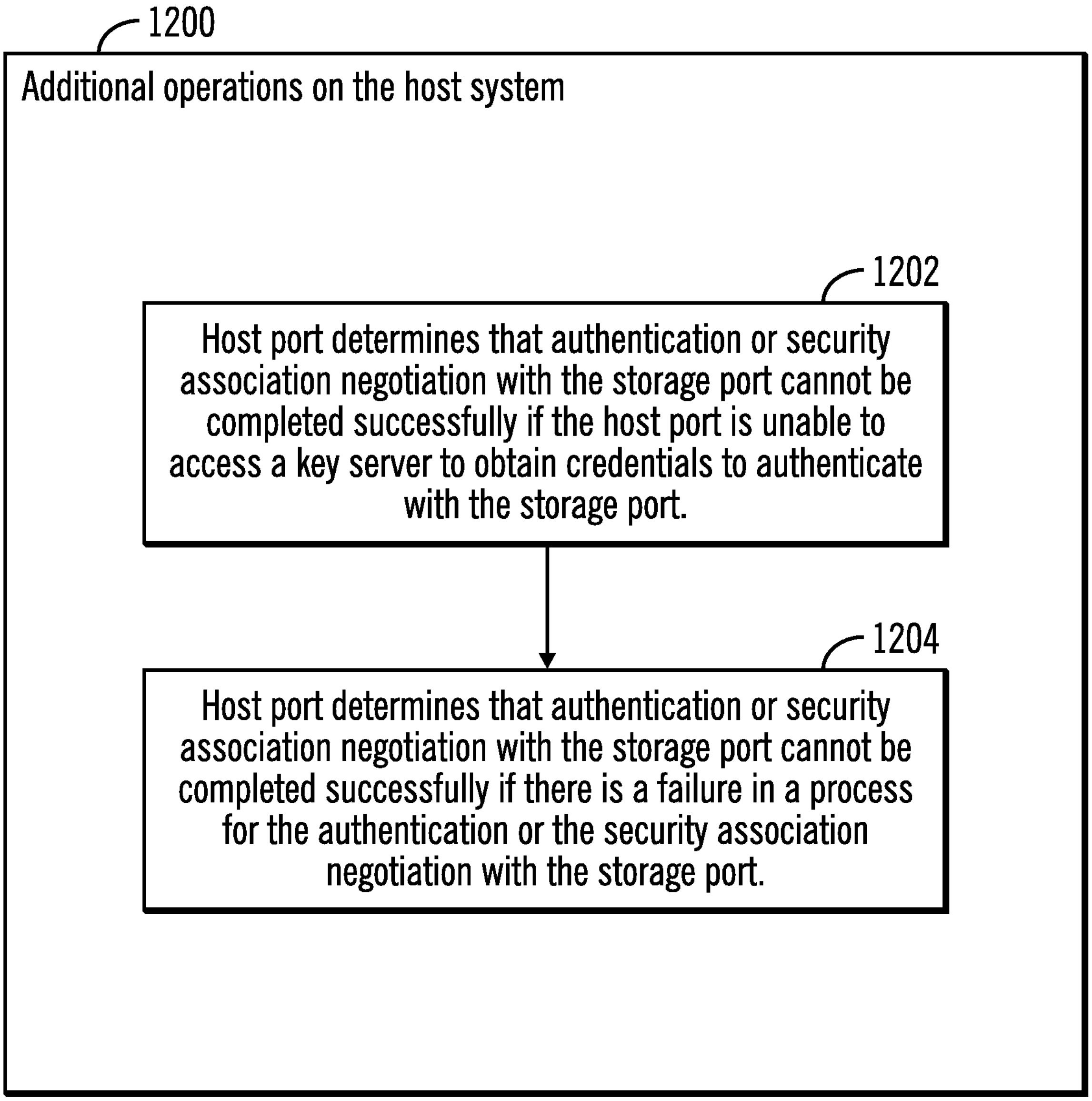
FIG. 12 illustrates flowchart that shows additional operations for maintaining access for security enablement on a host system, in accordance with certain embodiments.

FIG. 12 illustrates flowchart 1200 that shows additional operations for maintaining access for security enablement on a host system, in accordance with certain embodiments.

The host port determines (at block 1202) that authentication or security association negotiation with the storage port cannot be completed successfully if the host port is unable to access a key server to obtain credentials to authenticate with the storage port. As a result, the host port may take further action to determine a status of the audit indicator to determine whether to send I/O requests to the storage port.

From block 1202 control proceeds to block 1204 in which, the host port determines that authentication or security association negotiation with a storage port cannot be completed successfully if there is a failure in a process for the authentication or the security association negotiation with the storage port. As a result, the host port may take further action to determine a status of the audit indicator to determine whether to send I/O requests to the storage port.

Figure 13:
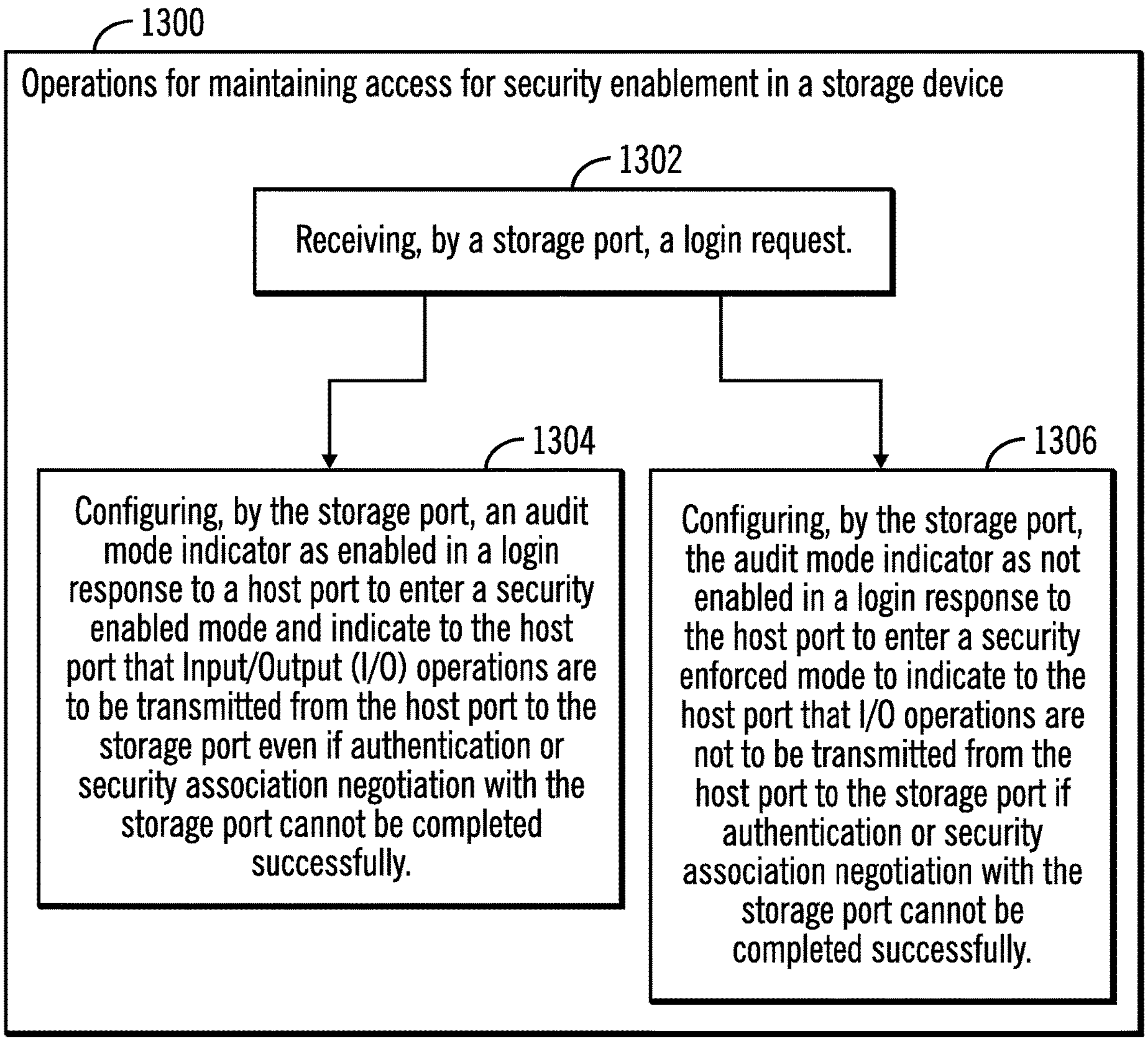
FIG. 13 illustrates flowchart that shows operations for maintaining access for security enablement in a storage device, in accordance with certain embodiments.

FIG. 13 illustrates flowchart 1300 that shows operations for maintaining access for security enablement in a storage device, in accordance with certain embodiments.

Control starts at block 1302 in which a storage port receives a login request. From block 1302 control may proceed to block 1304 or to block 1306.

In block 1304, the storage port configures the audit mode indicator as enabled in a login response to a host port to enter a security enabled mode to indicate to the host port that Input/Output (I/O) operations are to be transmitted from the host port to the storage port even if authentication or security association negotiation with the storage port cannot be completed successfully. As a result, hosts that are not secure may perform I/O to a storage device.

In block 1306, the storage port configures the audit mode indicator as not enabled in a login response to the host port to enter a security enforced mode to indicate to the host port that I/O operations are not to be transmitted from the host port to the storage port if authentication or security association negotiation with the storage port cannot be completed successfully. As a result, hosts that are not secure are unable to perform I/O to a storage device.

Figure 14:
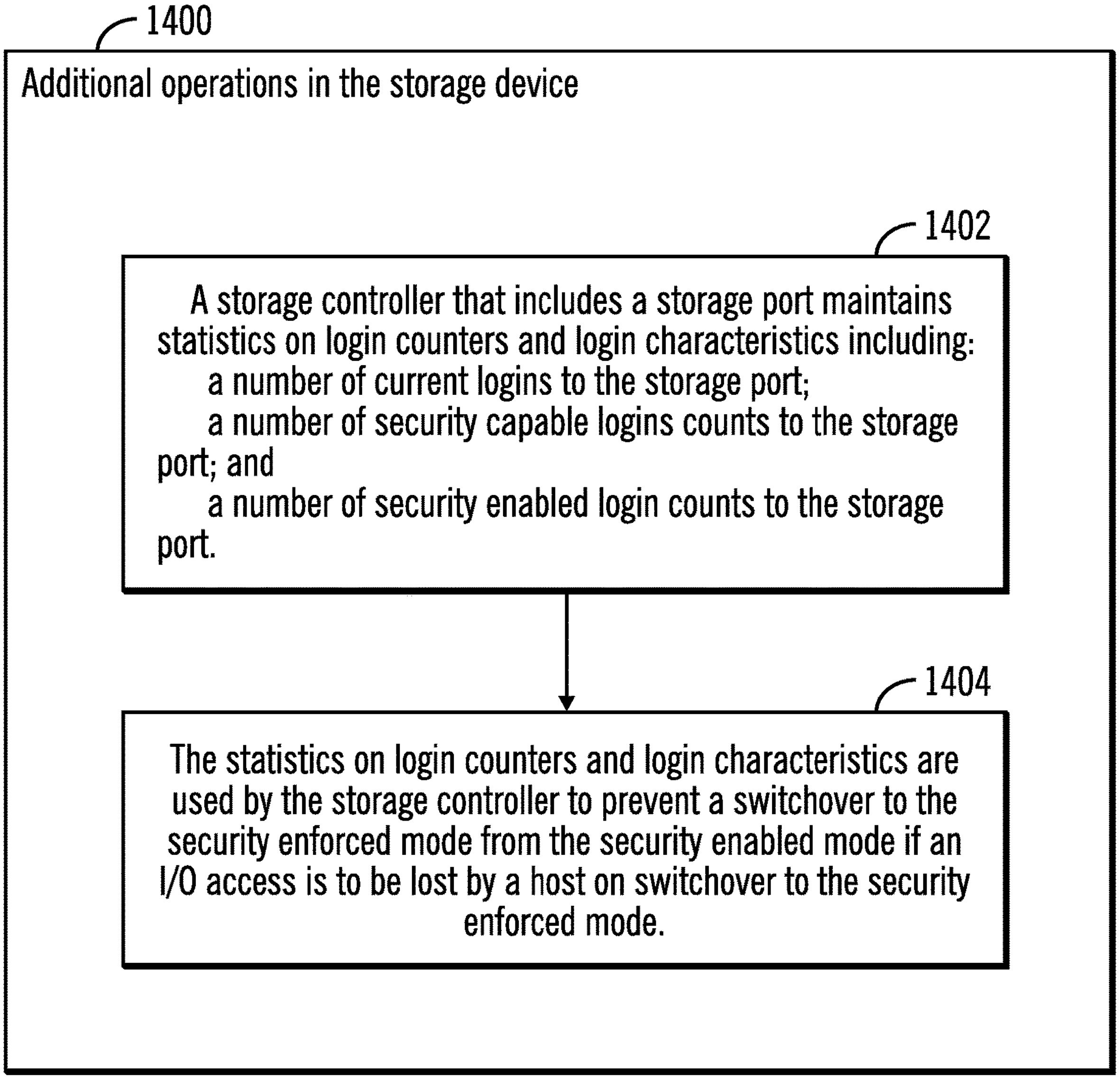
FIG. 14 illustrates flowchart that shows additional operations for maintaining access for security enablement in a storage device, in accordance with certain embodiments.

FIG. 14 illustrates flowchart 1400 that shows additional operations for maintaining access for security enablement in a storage device.

Control starts at block 1402 a storage controller that includes the storage port maintain statistics on login counters and login characteristics including: a number of current logins to the storage port; a number of security capable logins counts to the storage port; and a number of security enabled login counts to the storage port. As a result, in certain embodiments, the statistics on login counters and login characteristics are used by the storage controller for determining an effect on I/O access by hosts if the security enforced mode is configured.

In additional embodiments, the statistics on login counters and login characteristics are used by the storage controller to prevent (at block 1404) a switchover to the security enforced mode from the security enabled mode if an I/O access is to be lost by a host on switchover to the security enforced mode. As a result, switchover to security enforced mode is prevented if a host would lose I/O access.

In certain embodiments, the storage controller provides an option to force switchover to the security enforced mode without consideration of the statistics on login counters and login characteristics.

In certain embodiments a storage controller configures at least one storage port of the plurality of storage ports to the security enforced mode. The storage controller configures at least one another storage port of the plurality of storage ports to the security enabled mode. Therefore, enablement of audit mode indicator is on a per port basis.

In further embodiments, the storage port is included in a storage controller that includes a first storage array and a second storage array, wherein the security enforced mode is configured for the first storage array, and wherein the security enabled mode is configured for the second storage array. Therefore, enablement of audit mode indicator is on a per storage array basis.

Therefore, FIGS. 1-14 illustrate certain embodiments to enforce or not enforce security based on configuration of an audit mode indicator to augment operations based on the configuration of the security hit in Fibre Channel. As a result, legacy devices are able to continue with I/O in a heterogeneous computing environment even when the security bit is enabled in Fibre Channel Cloud Computing Environment Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 15:
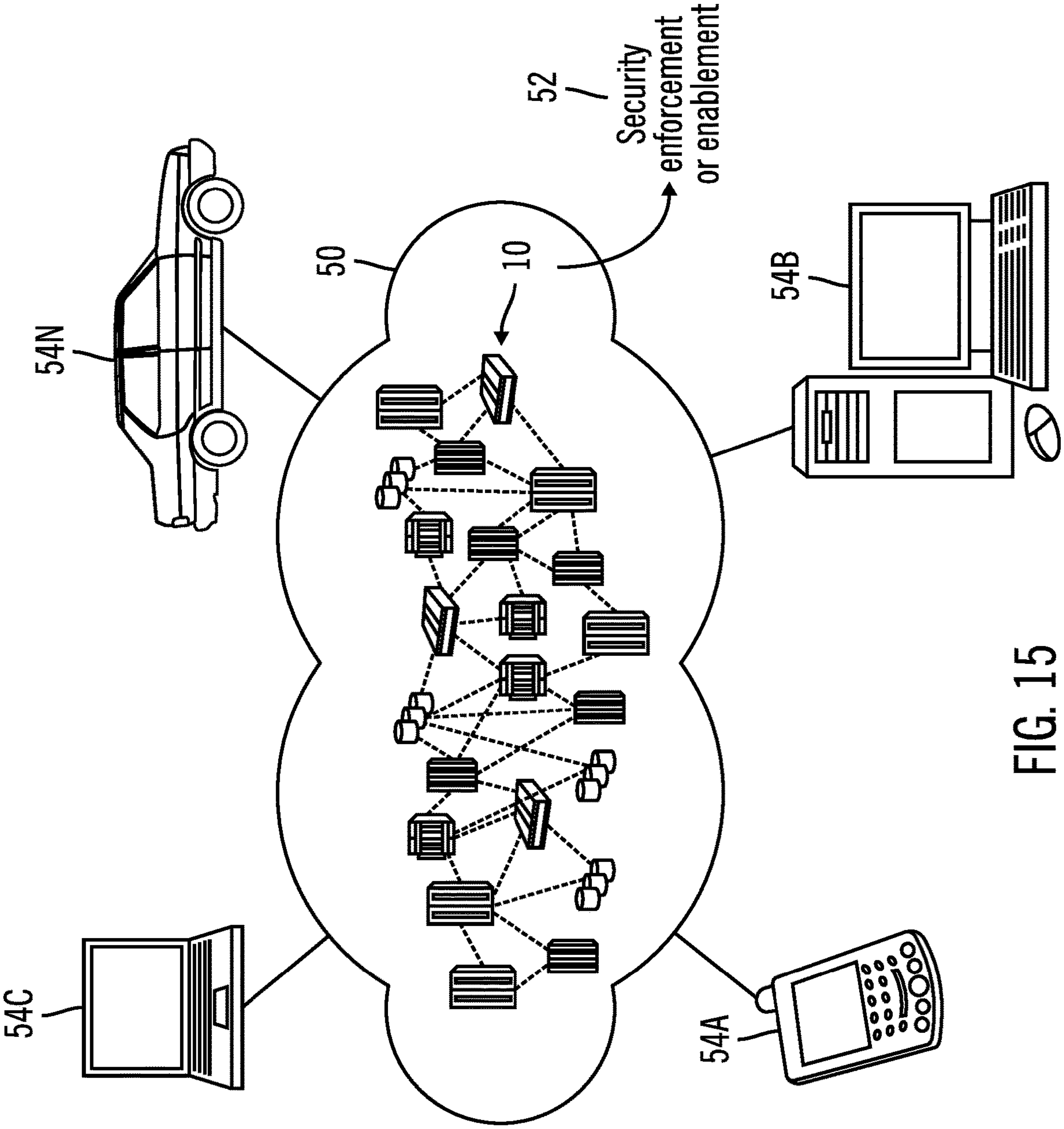
FIG. 15 illustrates a block diagram of a cloud computing environment, in accordance with certain embodiments.

Referring now to FIG. 15 an illustrative cloud computing environment 50 is depicted. Security enforcement or enablement (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
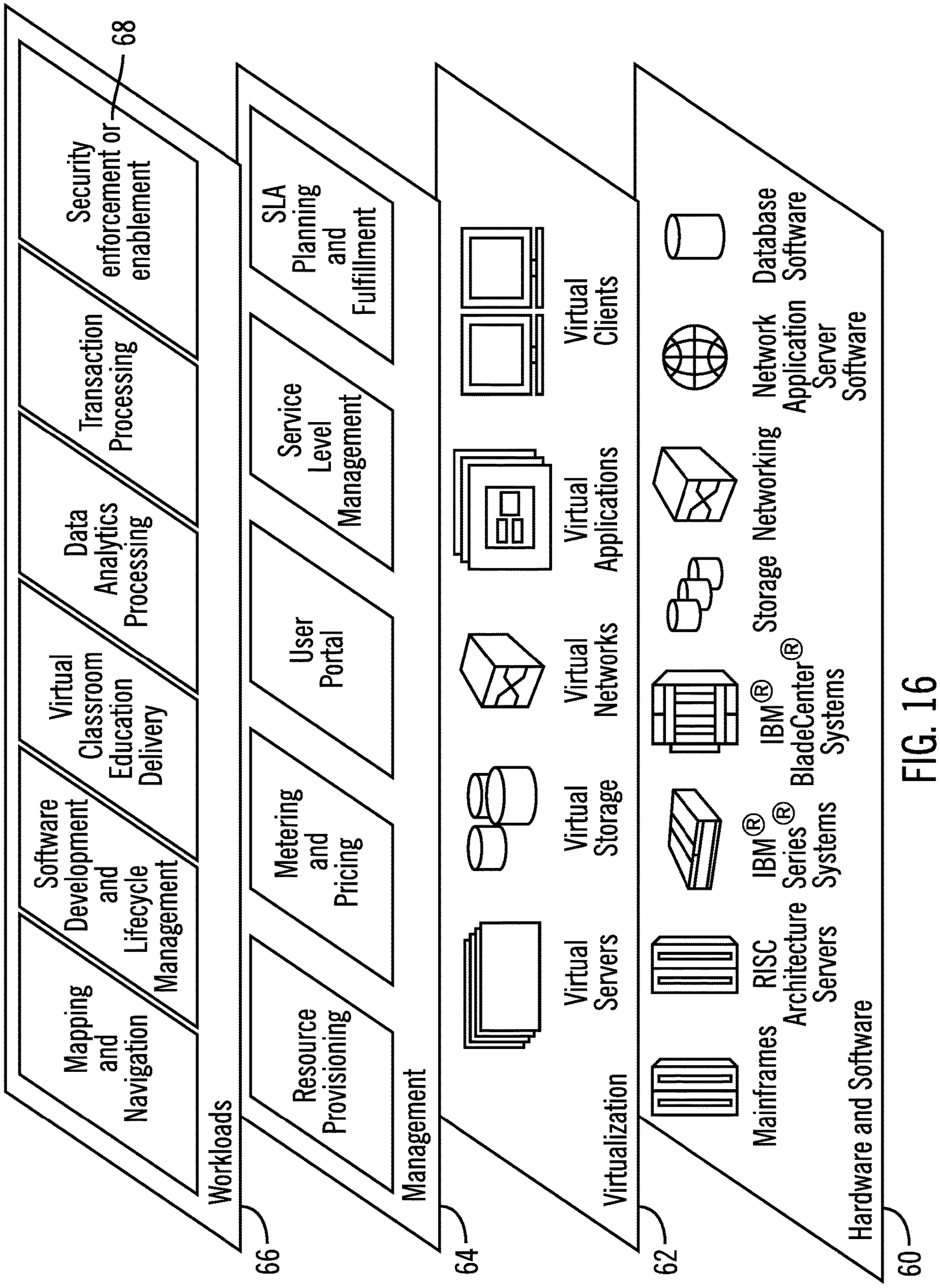
FIG. 16 illustrates a block diagram of further details of the cloud computing environment of FIG. 15, in accordance with certain embodiments.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto.

Hardware and software layer 60 includes hardware and software components. Examples of hardware components include mainframes, in one example IBM ZSERIES*systems; RISC (Reduced instruction Set Computer) architecture based servers, in one example IBM PSERIES*systems; IBM XSERIES*systems; IBM BLADECENTER*systems; storage devices; networks and networking components. Examples of software components include network application server software, in one example IBM WEBSPHERE*application server software; and database software, in one example IBM DB2*database software.

*IBM, ZSERIES, PSERIES, XSERIES, BLADECENTER, WEBSPHERE, and DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security enforcement or enablement 68 as shown in FIGS. 1-15.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 17:
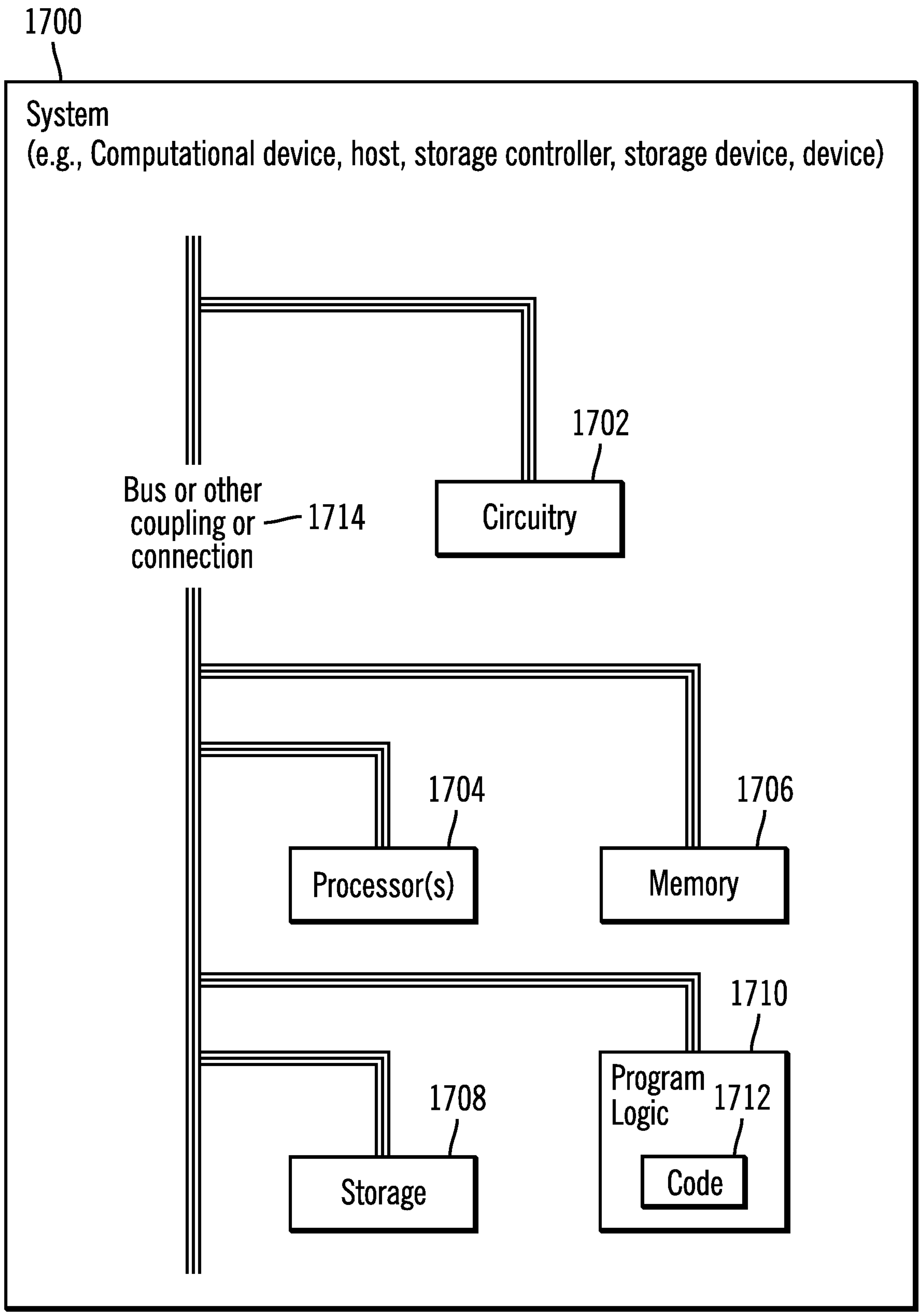
FIG. 17 illustrates a block diagram of a computational system that shows certain elements that may be included in the hosts, storage controllers and storage devices, as described in FIGS. 1-16, in accordance with certain embodiments.

FIG. 17 illustrates a block diagram that shows certain elements that may be included in the computational devices, the hosts, the storage controllers, the storage devices, or other devices shown in FIGS. 1-16, in accordance with certain embodiments. The system 1700 may include a circuitry 1702 that may in certain embodiments include at least a processor 1704. The system 1700 may also include a memory 1706 (e.g., a volatile memory device), and storage 1708. The storage 1708 may include a non-volatile memory device (e.g., EEPROM, ROM, PROM, flash, firmware, programmable logic, etc.), magnetic disk drive, optical disk drive, tape drive, etc. The storage 1708 may comprise an internal storage device, an attached storage device and/or a network accessible storage device. The system 1700 may include a program logic 1710 including code 1712 that may be loaded into the memory 1706 and executed by the processor 1704 or circuitry 1702. In certain embodiments, the program logic 1710 including code 1712 may be stored in the storage 1708. In certain other embodiments, the program logic 1710 may be implemented in the circuitry 1702. One or more of the components in the system 1700 may communicate via a bus or via other coupling or connection 1714. Therefore, while FIG. 17 shows the program logic 1710 separately from the other elements, the program logic 1710 may be implemented in the memory 1706 and/or the circuitry 1702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

enabling a host port for security;

in response to determining by the host port that authentication or security association negotiation with a storage port cannot be completed successfully, determining by the host port, whether an audit mode indicator has been enabled in a login response from the storage port;

in response to determining that the audit mode indicator has been enabled in the login response from the storage port, performing, by the host port, input/output (I/O) to the storage port; and in response to determining that the audit mode indicator has not been enabled in the login response from the storage port, avoiding performing by the host port, I/O to the storage port, and returning, by the host port, I/O requests to an operating system of a host computational device.

2. The method of claim 1, wherein the audit mode indicator is enabled via an indication in an auxiliary parameter data word in programs that implement Fibre Channel Link Services.

3. A method, comprising:

enabling a host port for security;

in response to determining by the host port that authentication or security association negotiation with a storage port cannot be completed successfully, determining by the host port, whether an audit mode indicator has been enabled in a login response from the storage port; and preserving, by the host port, input/output (I/O) access to the storage port based on determining whether the audit mode indicator has been enabled in the login response from the storage port, wherein the host port determines that authentication or security association negotiation with the storage port cannot be completed successfully if the host port is unable to access a key server to obtain credentials to authenticate with the storage port.

4. The method of claim 3, wherein the host port determines that authentication or security association negotiation with the storage port cannot be completed successfully if there is a failure in a process for the authentication or the security association negotiation with the storage port.

5. A system, comprising:

a memory; and a processor coupled to the memory, wherein the processor performs operations, the operations comprising:

enabling a host port for security;

in response to determining by the host port that authentication or security association negotiation with a storage port cannot be completed successfully, determining by the host port, whether an audit mode indicator has been enabled in a login response from the storage port;

in response to determining that the audit mode indicator has been enabled in the login response from the storage port, performing, by the host port, input/output (I/O) to the storage port; and in response to determining that the audit mode indicator has not been enabled in the login response from the storage port, avoiding performing by the host port, I/O to the storage port, and returning, by the host port, I/O requests to an operating system of a host computational device.

6. The system of claim 5, wherein the audit mode indicator is enabled via an indication in an auxiliary parameter data word in programs that implement Fibre Channel Link Services.

7. A system, comprising:

a memory; and a processor coupled to the memory, wherein the processor performs operations, the operations comprising:

enabling a host port for security;

in response to determining by the host port that authentication or security association negotiation with a storage port cannot be completed successfully, determining by the host port, whether an audit mode indicator has been enabled in a login response from the storage port; and preserving, by the host port, input/output (I/O) access to the storage port based on determining whether the audit mode indicator has been enabled in the login response from the storage port, wherein the host port determines that authentication or security association negotiation with the storage port cannot be completed successfully if the host port is unable to access a key server to obtain credentials to authenticate with the storage port.

8. The system of claim 7, wherein the host port determines that authentication or security association negotiation with the storage port cannot be completed successfully if there is a failure in a process for the authentication or the security association negotiation with the storage port.

9. A computer program product, the computer program product comprising a computer readable storage medium having computer readable program code embodied therewith, the computer readable program code configured to perform operations, the operations comprising:

enabling a host port for security;

in response to determining by the host port that authentication or security association negotiation with a storage port cannot be completed successfully, determining by the host port, whether an audit mode indicator has been enabled in a login response from the storage port;

in response to determining that the audit mode indicator has been enabled in the login response from the storage port, performing, by the host port, input/output (I/O) to the storage port; and in response to determining that the audit mode indicator has not been enabled in the login response from the storage port, avoiding performing by the host port, I/O to the storage port, and returning, by the host port, I/O requests to an operating system of a host computational device.

10. The computer program product of claim 9, wherein the audit mode indicator is enabled via an indication in an auxiliary parameter data word in programs that implement Fibre Channel Link Services.

11. A computer program product, the computer program product comprising a computer readable storage medium having computer readable program code embodied therewith, the computer readable program code configured to perform operations, the operations comprising:

enabling a host port for security;

in response to determining by the host port that authentication or security association negotiation with a storage port cannot be completed successfully, determining by the host port, whether an audit mode indicator has been enabled in a login response from the storage port; and preserving, by the host port, input/output (I/O) access to the storage port based on determining whether the audit mode indicator has been enabled in the login response from the storage port, wherein the host port determines that authentication or security association negotiation with the storage port cannot be completed successfully if the host port is unable to access a key server to obtain credentials to authenticate with the storage port.

12. The computer program product of claim 11, wherein the host port determines that authentication or security association negotiation with the storage port cannot be completed successfully if there is a failure in a process for the authentication or the security association negotiation with the storage port.

13. A data structure implemented in a memory of a device, the data structure comprising:

a security bit, wherein the security bit enables a host port for security; and an audit mode indicator, wherein configuration of the audit mode indicator is used by the device to perform operations, the operations comprising:

in response to determining by the host port that authentication or security association negotiation with a storage port cannot be completed successfully, determining by the host port, whether the audit mode indicator has been enabled in a login response from the storage port;

in response to determining that the audit mode indicator has been enabled in the login response from the storage port, performing, by the host port, input/output (I/O) to the storage port; and in response to determining that the audit mode indicator has not been enabled in the login response from the storage port, avoiding performing by the host port, I/O to the storage port, and returning, by the host port, I/O requests to an operating system of a host computational device.

14. A data structure implemented in a memory of a device, the data structure comprising:

a security bit, wherein the security bit enables a host port for security; and an audit mode indicator, wherein configuration of the audit mode indicator is used by the device to perform operations, the operations comprising:

in response to determining by the host port that authentication or security association negotiation with a storage port cannot be completed successfully, determining by the host port, whether the audit mode indicator has been enabled in a login response from the storage port; and preserving, by the host port, input/output (I/O) access to the storage port based on determining whether the audit mode indicator has been enabled in the login response from the storage port, wherein the host port determines that authentication or security association negotiation with the storage port cannot be completed successfully if the host port is unable to access a key server to obtain credentials to authenticate with the storage port.

* * * * *